(12) United States Patent
Miller

(10) Patent No.: US 9,128,256 B2
(45) Date of Patent: Sep. 8, 2015

(54) OPTICAL CONNECTOR

(71) Applicant: Xyratex Technology Limited, Havant (GB)

(72) Inventor: Alistair Allen Miller, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 150 days.

(21) Appl. No.: 13/760,833

(22) Filed: Feb. 6, 2013

(65) Prior Publication Data

US 2014/0219624 A1    Aug. 7, 2014

(51) Int. Cl.
   *G02B 6/38* (2006.01)

(52) U.S. Cl.
   CPC ............ *G02B 6/3897* (2013.01); *G02B 6/3849* (2013.01); *G02B 6/3885* (2013.01)

(58) Field of Classification Search
   CPC .... G02B 6/3849; G02B 6/381; G02B 6/3825; H01R 13/4532; H01R 13/453; H01R 13/4538; H01R 13/447
   See application file for complete search history.

(56) References Cited

U.S. PATENT DOCUMENTS

| | | | |
|---|---|---|---|
| 4,180,301 A * | 12/1979 | Hutter | 439/271 |
| 5,708,745 A | 1/1998 | Yamaji et al. | |
| 5,818,993 A * | 10/1998 | Chudoba et al. | 385/81 |
| 6,039,585 A * | 3/2000 | Kim et al. | 439/137 |
| 6,508,593 B1 * | 1/2003 | Farnsworth et al. | 385/55 |
| 6,685,362 B2 * | 2/2004 | Burkholder et al. | 385/78 |
| 7,093,983 B2 * | 8/2006 | Taira et al. | 385/78 |
| 7,140,892 B2 * | 11/2006 | Takeuchi | 439/138 |
| 7,559,700 B2 * | 7/2009 | Eguchi et al. | 385/70 |
| 8,317,407 B2 * | 11/2012 | Hioki et al. | 385/73 |
| 8,764,313 B2 * | 7/2014 | Arishima et al. | 385/78 |
| 2001/0048790 A1 | 12/2001 | Burkholder et al. | |
| 2002/0006253 A1 | 1/2002 | Marchi | |
| 2004/0052472 A1 | 3/2004 | Roth et al. | |
| 2007/0019899 A1 | 1/2007 | Ohtsu et al. | |
| 2008/0247709 A1 * | 10/2008 | Eguchi et al. | 385/60 |
| 2012/0076461 A1 | 3/2012 | Hsieh et al. | |

(Continued)

FOREIGN PATENT DOCUMENTS

| CN | 2013 87499 Y | 1/2010 |
|---|---|---|
| EP | 1139128 A2 | 3/2001 |

(Continued)

OTHER PUBLICATIONS

United Kingdom Combined Search and Examination Report dated Jul. 26, 2013 in corresponding Great Britain Patent Application No. GB1302097.9.
Henning Schröder et al., "Glass Panel Processing for Electrical and Optical Packaging," Electronic Components and Technology Conference, pp. 625-633 (2011).

*Primary Examiner* — Rhonda Peace
(74) *Attorney, Agent, or Firm* — Mueting, Raasch & Gebhardt, P.A.

(57) ABSTRACT

The invention provides an optical connector for coupling with a complementary optical connector and for supporting an optical component. The connector comprises a cover moveable between a first and second position. The cover may also comprise a moveable shield and biasing components. There is also provided an optical connector assembly comprising covers that sequentially open. A PCB comprising waveguides and an optical component sub-mount for integrating with the PCB is also presented.

15 Claims, 21 Drawing Sheets

(56) References Cited

U.S. PATENT DOCUMENTS

2012/0219253 A1* 8/2012 Arishima et al. ............... 385/76
2014/0219624 A1* 8/2014 Miller ........................... 385/139

FOREIGN PATENT DOCUMENTS

FR 2464490 A1 3/1981
WO 03/019260 A2 3/2003

* cited by examiner

OPTICAL CONNECTOR

The present invention is in the field of connectors and in particular optical connectors used for mating together single or arrays of optical fibres.

Optical fibres are commonly used as a data transmission media between end to end communication terminals and between devices operative to transmit and/or receive optical signals. Devices can often be provided with an input and/or output optical fibre or set of fibres terminating in a ferrule. Typical ferrules can have either male or female connection features for mating to a complementary ferrule carrying another fibre of set of fibres. Once the ferrules are mated, the fibres of each ferrule adjoin, typically by butt coupling, to provide optical communication from one device to another device.

Various types of ferrules exist and can be categorised in a variety of ways including the fitting mechanism to other ferrules. Fitting mechanisms include screw fittings, bayonet fitting and snap fittings. An example of a snap fitting ferrule is an optical Mechanical Transfer (MT) Ferrule. Optical MT ferrules are commonly used in the data communication industry because they are cheap to manufacture and provide a simple connection that can be easily used by field engineers and implemented by manufacturing processes.

Optical MT Ferrules are typically small and often only couple together with other MT ferrules using a set of guiding pins in one ferrule and corresponding holes in the other ferrule, allowing the ferrules to be pulled apart and put together freely, In systems requiring consistent optical connection between devices with an optical output/input, it is desirable to establish locked optical connections between fibres where MT ferrules are used as terminals. Optical connectors are known that act to carry and house a single MT ferrule and provide a connector engaging mechanism which locks the connector to other complementary connectors carrying complementary MT ferrules.

Some optical connectors are known to include a moveable dust cover at the end (connecting) facet of the connector. Such covers act to stop dust and other unwanted particles entering the connectors and residing upon the ferrule, degrading optical performance. Upon engagement with another connector, such existing covers are forced inwards into their own connector, where the nominally outer facing surface of the cover ends up facing towards the ferrule that the connector is carrying.

When devices with optical connectors are integrated into larger systems, such as data storage solutions, they are often located on mounting supports such as printed circuit boards (PCB's). Connectors carrying optical fibres are often rigidly affixed by screwing the connector onto the PCB.

The present invention relates to optical connectors. The features described in any of the first, second, third and fourth aspects are intended, where technically compatible, to correspond to similar features in any of the other said aspects unless otherwise specified.

The present inventors have discovered that existing connector dust covers in an open position (where the nominal outer surface that collects dust and other particulates faces the optical fibre ferrule) can undesirably deposit dust upon the ferrule within the connector. This phenomenon typically results from the dust collected on the outer surface of the cover falling upon the ferrule as the cover is moved from a closed (protective) position to an open position as the ferrules are mated together. When engaging with another connector, existing dust covers are often mechanically forced to pivot or swing inwardly inside the connector exposing the ferrule to the dirty outer surface. This cover movement, combined with the general physical movement of the connection, agitates the dust off the cover onto the end facets of the fibres causing optical signal degradation at the optical coupling interface when optical components from engaged connectors are optically connected.

According to a first aspect there is provided:

An optical connector, suitable for: coupling with a complementary connector along a direction of connector engagement; and, supporting a first optical component; the connector comprising a first cover comprising an outer surface; wherein the first cover is configured: in a first position: to reside at least partially in-front of the first optical component along a direction parallel to the direction of connector engagement; and, to provide at least a component of the outer surface normal, that is parallel to the direction of connector engagement; to be movable to a second position wherein the said outer surface of the first cover continually faces away from the first optical component upon movement between the first and second positions.

By having the outer surface of the cover continually facing away from the optical component as the cover moves from a closed to an open position, any dust that has accumulated upon the said outer surface portion will not fall directly upon the optical component as the cover moves.

In this first aspect there may be provided, in any suitable combination, the following further features, where it is to be understood that the following further features of the first aspect may also be combined, where suitable, to an optical connector of any of the second, third and fourth aspects.

The optical connector may be configured such that the first cover at least partially obscures the first optical component along the direction of connector engagement when in the first cover position.

This configuration provides the optical component with some 'front facing' protection to the external environment. This is particularly advantageous when the optical component behind the cover has a front facing optical coupling facet.

The optical connector may be configured such that the first cover comprises an inner surface and is configured in the first position to provide: the outer surface at least partially facing towards the direction of connector engagement; and, the inner surface at least partially facing the first optical component.

The optical connector may be configured such that the optical connector comprises an optical communication path towards the complementary connector. The optical communication path from the connector may be a direct path from the optical component propagating outwardly from the connector, or may by an indirect path where the optical path from the optical component passes through, or is reflected off, a further optical component housed in the connector such as a lens or a mirror.

The optical connector may be configured such that the first cover is configured in the first position to at least partially incline towards the optical communication path.

The optical connector may be configured such that the connector further comprises a first shield moveable between a respective first position and a respective second position; whereby the shield, in its first position, is configured to be disposed in the path of optical communication.

The optical connector may be configured such that the shield, in its first position, is configured to be disposed between the first optical component and the first cover when the first cover is in its respective first position.

The optical connector may be configured such that the first cover and first shield are configured to be mechanically urged from their respective first positions towards their respective second positions as the optical connector and complementary connector are urged into coupling engagement.

The optical connector may be configured such that the first shield is configured to move from the first shield position towards the second shield position after the first cover moves from is first position towards its second position, as the optical connector and complementary connector are urged into coupling engagement.

The optical connector may be configured such that the first cover at least partially obscures the first optical component along the optical communication path. This allows the cover to help protect the facet of the optical component as well as providing some protection to a user by blocking light exiting an unconnected connector.

The optical connector may be configured such that the first cover at least partially obscures the first optical component along the direction of connector engagement when in the first position.

By having the cover at least partially obscure the optical component, it acts to block the movement of unwanted contaminating material towards the optical component. For example, the first position may be a closed position wherein the cover is inclined towards the direction of optical communication and/or connector coupling.

The optical connector may further be configured such that the first and second positions of the first cover are first and second end positions. An end position being a position where the cover cannot move any further along the same movement path it took to get to that position.

The optical connector may be configured such that: the direction of connector engagement is along an axis of optical connector engagement; the first cover is configured to be mechanically urged towards the second position in an opening direction substantially perpendicular from the axis of optical connector engagement. The axis of optical connector engagement is the longitudinal axis that both connectors must align upon to correctly engage with each other. If the cover opens perpendicularly away from this axis then it allows the creation of an opening. Furthermore, if the cover is inclined forwardly towards this axis then the outer surface of the cover faces away from the optical component as it opens.

The optical connector may be configured such that the first cover is configured in its second position to create an opening sized to accommodate at least the first optical component. The second position therefore allows the first optical component to protrude and optically communicate through the opening.

The optical connector may be configured such that the first cover is configured in its second position to create an opening sized to accommodate at least part of the complementary optical connector. A connector configured to provide this opening allows the complementary connector to be at least partially inserted into the connector, thus providing a peripherally enclosed environment where the optical components of each connector may couple. Preferably this opening is sized to accommodate one or more covers and the optical component of the complementary connector.

The optical connector may comprise a second cover configured to be moveable between a respective first and second position, wherein each cover is configured to be urged substantially apart from the corresponding cover as each cover is mechanically urged from its respective first position to second position. Preferably the second cover is disposed symmetrically opposite the first cover about the axis of optical connector engagement and opens from first to second position in a substantially opposite manner.

The optical connector may be configured such that the first and second covers are together configured in their respective second positions to create an opening sized to accommodate at least the first optical component.

The optical connector may be configured such that the first and second covers are together configured in their respective second positions to create an opening sized to accommodate at least part of the complementary optical connector, The optical connector may be configured such that each cover substantially converges towards the other cover; each cover further comprising a forwardly terminating lip outwardly turned away from the other cover. Having such a lip disposed at the point where the first and second covers (of the same connector) substantially converge allows an external component to contact the lips and push the covers outwardly away from each other.

The optical connector may be configured such that the optical connector is configured to move the first optical component to contact and urge any of the first cover and a second cover from a respective first position to a second position as the first and second optical connectors are urged into mechanical engagement. In this configuration the movement of the optical component forwardly within the connector acts to push apart the covers.

The optical connector may be configured such that the optical connector is configured to move the optical component through an opening.

The optical connector may be configured such that each cover comprises a resiliently biased sheet configured to move from the first position to the second position via a pivot. The sheet may therefore flex about one or more pivots, for example a pivot line. The sheet may extend beyond the cover such that the pivot is a fold line along the sheet wherein at least a portion of the sheet distal from the cover of the other side of the fold line, may be used to secure the sheet, hence the cover, to the connector.

According to a second aspect there is provided:

An optical connector suitable for: coupling with a complementary connector along a direction of connector engagement; and, supporting a first optical component; the connector comprising: an optical communication path towards the complementary connector; a first cover moveable between a respective first position and a second position and comprising an outer surface; wherein the first cover is configured in the first position: to reside at least partially in-front of the first optical component along a direction parallel to the direction of connector engagement; and, to provide at least a component of the outer surface normal, that is parallel to the direction of connector engagement; a first shield moveable between a respective first position and a second position; whereby the first shield, in its first position, is configured to be disposed in the path of optical communication.

Having a shield as well as a cover provides an extra degree of safety to the connector. If the cover, in its first position, does not properly close or otherwise does not obscure the optical path exiting the connector, then unwanted stray light may exit the connector, possibly causing eye injury or damage. A separate shield that is configured to block this light independently of the cover alleviates this problem. Preferably the shield is disposed internally within the connector with respect to the cover such that if the cover is accidentally prised apart, the optical output is still obscured.

Furthermore, in this second aspect there may be provided, in any suitable combination, the following further features, where it is to be understood that the following further features of the second aspect may also be combined, where suitable, to an optical connector as described in any of the first, third and fourth aspects.

The optical connector may be configured such that the first shield, in its first position, is configured to be disposed between the first optical component and the first cover when the first cover is in the first position.

The optical connector may be configured such that the first cover and first shield are configured to be mechanically urged from their respective first positions towards their respective second positions as the optical connector and complementary connector are urged into coupling engagement. This provides the connector with two independent protection features that may be automatically opened when the connectors are engaged so no other user input is required to move either the cover or the shield.

The optical connector may be configured such that the first shield is configured to move from its first position towards its second position after the first cover moves from its first position towards its second position as the optical connector and complementary connector are urged into coupling engagement. This allows the shield to continually block the optical path out of the connector as the connector covers are manoeuvred out of the first position to allow for connector engagement. As the connectors start to engage and the optical components come into coupling alignment, the possibility of light escaping from the connectors decreases or ceases due to part of one connector being inserted into the complementary connector and/or the complementary optical component obscuring the optical path. Once this engagement begins, the shield can move to let the optical components optically communicate without risking light escaping the combined connector assembly.

The optical connector may be configured wherein the first shield comprises: a first shield portion comprising an outer shield surface, the first shield portion configured in the first position: to reside at least partially in-front of the first optical component along a direction parallel to the direction of connector engagement; and, to provide at least a component of the outer shield surface normal, that is parallel to the direction of connector engagement; and, a second shield portion configured in the first position to be disposed in the path of optical communication. This puts the shield in front of the optical component in a similar configuration as the corresponding cover.

The optical connector may be configured such that the outer shield surface of the first shield portion lies substantially adjacent to an inner surface of the first cover when both first shield and first cover are in respective first positions. This allows the shield and cover to be housed in a compact space about the connector, reducing the overall connector size.

The optical connector may be configured such that the second shield portion is folded back from the first shield portion substantially towards the first optical component. The second shield portion may therefore be simply pushed outwardly as an external component enters the connector and moves toward the optical component. Such an external component could be part of the complementary connector and/or the associated optical component of the complementary connector.

The optical connector may comprise a second shield configured to move from a respective first position to a second position, whereby the second shield, in the first position, is configured to contact and support the second shield portion of the first shield in the first position.

According to a third aspect there is provided:

An optical connection assembly comprising: a first optical connector: comprising a first cover, and, suitable for supporting a first optical component; a second optical connector: comprising a first cover; and, configured to mechanically engage with the first optical connector along a direction of connector engagement, and, suitable for supporting a second optical component; the system being configured such that the first covers of the first and second optical connectors cover are mechanically urged sequentially from a respective first position to a respective second position as the first and second optical connectors are urged into mechanical engagement.

A connector assembly that sequentially opens the covers of the engaging connectors can allow one connector to initially engage with the other connector (possibly entering the other connector and/or being surrounded by a protective housing of the other connector) before opening its own covers. This allows the connector to provide a degree of protection from the outer environment before opening its own covers.

Furthermore, in this third aspect there may be provided, in any suitable combination, the following further features, where it is to be understood that the following further features of the third aspect may also be combined, where suitable, to an optical connector of any of the first, second and fourth aspects.

The assembly may be configured such that any one or more of the first covers are configured to be mechanically urged towards the respective second positions in an opening direction substantially perpendicular from an axis of optical connector engagement.

The assembly may be configured to allow for optical communication between the first and second optical components when both the first covers are in the respective second positions.

The assembly may be configured to prevent optical communication between the first and second optical components when any of the first covers are in the respective first positions.

The assembly may be configured initially to move the first cover of the second optical connector to its respective second position before the first cover of the first optical connector is subsequently mechanically urged towards its respective second position.

The assembly may be configured such that the first optical connector comprises a second cover configured to be moveable between a respective first and second position, wherein each of the first and second covers are configured to be urged substantially apart from the corresponding cover as each cover is mechanically urged from its respective first position to second position.

The assembly may be configured such that the second optical connector further comprises a second cover configured to be moveable between a respective first and second position, wherein each of the first and second covers are configured to be urged substantially apart from the corresponding cover as each cover is mechanically urged from its respective first position to second position.

The assembly may be configured such that any one or more of the first or second covers of the second optical connector substantially converges towards the corresponding cover in a the direction of connector engagement; each cover comprising a forwardly terminating lip outwardly turned away from the other cover. Such a lip allows for the opposing connector to contact and urge apart the covers on the current connector by allowing an engaging portion on the opposing connector to insert between the lips.

The assembly may be configured such that any one or more of the first cover or second cover of the second optical connector is configured in its second position to create a primary opening sized to accommodate at least: a portion of the first cover and/or second cover of the first optical connector in its first position; and, the first optical component.

The assembly may be configured such that any one or more of the first or second covers of the first optical connector is configured in its second position to create a secondary opening sized to accommodate at least the first optical component.

The assembly may be configured such that: an engaging portion of the first optical connector is configured to urge the first cover and/or second cover of the second optical connector from its first position to the second position; and, the first optical connector is configured to move the first optical component to contact and urge the first cover and/or second cover of the first optical connector from its first position to its second position; as the first and second optical connectors are urged into mechanical engagement.

The assembly may be configured such that the first optical connector is configured to move the first optical component through the secondary opening.

The assembly may be configured such that any one or more of the covers comprises an outer surface, and is configured in its respective first position: to reside at least partially in-front of its corresponding optical component along a direction parallel to the direction of connector engagement; and, to provide at least a component of the outer surface normal, that is parallel to the direction of connector engagement.

The assembly may be configured such that the outer surface of any one or more of the covers is configured to continually face away from the optical component of its associated optical connector as the cover is moved between said first and second positions.

The assembly may be configured such that; in the first position: any one or more of the covers is forwardly inclined towards the direction of connector engagement; and, the outer surface of the said cover at least partially faces towards the said direction.

The assembly may be configured such that: the first optical connector comprises a first alignment component; the second optical connector comprises a second alignment component complementary to the first alignment component; the first and second alignment components being configured to cooperatively guide the first optical connector into alignment with the second optical connector as the first and second optical connectors are urged into mechanical engagement.

The assembly may be configured such that the: first alignment component comprises at least one narrowing tapered portion substantially converging towards the direction of connector engagement; and, the second alignment component comprises at least one funnelling tapered portion substantially diverging outwardly in the direction of connector engagement. The first alignment component may be configured to enter the primary opening of the second optical connector.

The assembly may be configured such that the said tapered portions are parallel to the opening direction.

The assembly may be configured such that the first optical connector comprises: a first biasing component configured to resiliently bias the first optical component away from the first cover and/or second cover of the first optical connector; and, a second biasing component comprising a biasing strength greater than the first biasing component; and configured in use to resiliently bias any one of: the optical components or, first and/or second covers of the first optical connector, toward the other, as the first optical connector is urged into mechanical engagement with the second optical connector.

The assembly may be configured such that: the first optical connector further comprises a biasing reference portion; wherein: both the first optical component and first cover of the first optical connector are moveable relative to the biasing reference portion; the second biasing component is coupled to the biasing reference portion.

The assembly may be configured such that: the first optical connector being configured to: engage with the second optical connector substantially along an axis of connection; and, allow any one of the: first optical component; or, first and/or second cover of the first optical connector; to move towards the other, substantially along the axis of connection as the first optical connector contacts and urges towards the second optical connector; the first and second biasing components are configured to provide bias force substantially along the axis of connection.

The assembly may be configured such that the first optical connector comprises a connector component configured to support the first optical component. The connector component may be an optical mount.

The assembly may be configured such that: the first biasing component is coupled between the first and/or second cover and the connector component; and, the second biasing component is coupled between the biasing reference portion and the connector component.

The assembly may be configured such that: the first biasing component is biased to push the first and/or second cover away from the connector component; the second biasing component is biased to push the connector component away from the biasing reference portion.

The assembly may be configured such that one of the first or second connectors comprises a housing, the housing configured, upon mechanical engagement of the first and second connectors, to at least partially surround the covers associated with the other optical connector before any of the said covers are urged from the respective first positions towards the respective second positions. This provides a degree of protection to the optical components from the outer environment because the covers only open once the housing surrounds the complementary connector.

The assembly may be configured such that the first optical connector comprises the said housing.

The assembly may comprise a first and second optical component.

The assembly may be configured such that any one or more of the first or second optical components comprises an optical ferrule.

The assembly may be configured wherein the optical ferrule is an MT ferrule.

According to a fourth aspect there is provided:

An optical connector suitable for: supporting a first optical component; and, mechanically engaging with a complementary optical connector when said connectors are contacted and urged towards each other; the optical connector comprising: a first connector component; a first biasing component configured to resiliently bias the first optical component away from the first connector component; and, a second biasing component, comprising a biasing strength greater than the first biasing component; and configured in use to resiliently bias any one of the first optical component or first connector component towards the other component as the connector is urged into mechanical engagement with the complementary connector.

This provides a mechanism for having a first component (such as a front engaging component) that is nominally biased away and separated from the optical component when the connector is in an unengaged configuration. If however the optical component and the first connector component are free to move about the connector and one is pushed towards the other (for example the first connector component is pushed backward into the connector towards the optical component as the connectors engage) the second biasing component ensures that in the engaged configuration, the optical component and first connector component are urged towards each other. The optical component may be supported by an optical mount, wherein the biasing components may provide bias force to the optical mount (and hence also the optical component).

For example, the first connector component may comprise one or more covers and may be pushed inwardly upon engagement with the complementary connector. The first biasing component in turn acts push the optical component backwards away from the first connector component and complementary connector. The optical connector however is not forced backwards because the second biasing component provides a stronger force in the opposite direction causing the optical component to enter the first connector component and force open the covers.

Other configuration may also be possible, for example the first connector component may be an electrical contact residing behind the optical component, wherein an unengaged configuration, where no external forces are applied to the said components, the optical component and contact are kept separated by the first biasing component. Once the connectors engage and an external force is applied to push the optical component backward towards the contact, the second biasing member acts to ensure the contact does not keep moving backwardly away from the optical component via the action of first biasing member, thus ensuring upon engagement that the optical component touches the contact.

Furthermore, in this fourth aspect there may be provided, in any suitable combination, the following further features, where it is to be understood that the following further features of the fourth aspect may also be combined, where suitable, to an optical connector of any of the first, second and third aspects.

The optical connector may be configured such that: the optical connector further comprises a biasing reference portion; wherein: both the first optical component and first connector component are moveable relative to the biasing reference portion; the second biasing component is coupled to the biasing reference portion.

By having both optical component and first connector component moveable about the connector and linked via the biasing components, the above advantages upon engagement can be utilised when the external engaging component of the complementary, connector requires, to be fully engaged with the current connector, to push the corresponding engaging component of the current connector further than the first biasing component can compress.

The following example illustrates this advantage with reference to a particular arrangement of connector features, however the principles can be applied to any suitable arrangement of components in a connector as described herein. In this example the connector is a plug connector and the complementary connector is a receptacle connector. The plug connector comprises: a front engaging component that is moveable about the connector, possibly comprising one or more moveable covers; and an optical component residing behind the front engaging component the opposite side of the front engaging component to where the complementary connector engages. The optical component may be carried by a second connector component such as an optical mount. The first biasing component is connected between the front engaging component and the optical connector (or second connector component). In this situation, as a complementary engaging component of the receptacle contacts the front engaging component and urges the front engaging component backwards towards the optical component, the first biasing component is compressed. Once the first biasing component reaches its full extent of compression, the optical component and front engaging component are brought together, which may be in contact or in proximity such that the said components of the connector may functionally interact. At this point, the second biasing component may then further compress to allow the complementary engaging component to continually move along its engaging path until it is stopped, for example by a stop or an alignment feature on the connector, or by the full compression of the second biasing component. The second biasing component may also have compressed to an extent as the first biasing component was compressing. Typically the second biasing component is connected between the back of the optical component (and/or second connector component) and a biasing reference portion. The biasing reference portion is typically in a rigid fixed positional relationship with respect to the connector and is typically situated the opposite side of the optical component from the first biasing component. The biasing components typically comprise one or more springs, but may be any suitable biasing component. Once the first biasing component is compressed it remains compressed (i.e. the optical component and/or second connector component are kept 'functionally' together) as the complementary engaging component urges forward pushing the front engaging component backwards. This is due to the second biasing component comprises a greater biasing strength than the first biasing component.

In this manner the second biasing component can provide an extra degree of freedom of movement along the same axis as the first biasing component to accommodate different connector designs, yet continually keep the front engaging component and optical component in functional contact or close proximity by keeping the first biasing component continually compressed.

The optical connector may be configured such that: the optical connector is configured to: engage with the complementary optical connector substantially along an axis of connection; and, allow any one of the first optical component or first connector component to move towards the other component substantially along the axis of connection as the optical connector contacts and urges towards the complementary optical connector; the first and second biasing components are configured to provide bias force substantially along the axis of connection.

The optical connector may be configured such that: the first biasing component is configured to communicate bias force between the first optical component and the first connector component; the second biasing component is configured to communicate bias force between the biasing reference portion and the first optical component.

The optical connector may comprise a second connector component configured to support the first optical component.

The optical connector may be configured such that: the first biasing component is coupled between the first connector component and the second connector component; and, the second biasing component is coupled between the biasing reference portion and the second connector component.

The optical connector may be configured such that: the first biasing component is biased to push the first connector component away from the second connector component; the second biasing component is biased to push the second connector component away from the biasing reference portion.

The optical connector may be configured such that the first connector component comprises a first cover configured to be mechanically urged sequentially from a respective first position to a respective second position as the optical connectors are urged into mechanical engagement.

The optical connector may be configured such that the first cover is configured in its second position to create an opening sized to accommodate at least the first optical component.

The optical connector may be configured to move the first optical component to contact and urge the first cover from the first position to the second position as the optical connectors are urged into mechanical engagement.

The optical connector may be configured to move the first optical component through the opening.

The optical connector may be configured such that the first cover comprises an outer surface configured to continually face away from the first optical component as it moves between said first and second positions, The optical connector may comprise a second cover configured to be moveable between a respective first and second position, wherein each cover is configured to be urged substantially apart from the corresponding cover as each cover is mechanically urged from its respective first position to second position.

The optical connector may be configured such that: the connector comprises a first alignment component that is: moveable relative to the biasing reference portion; configured in use to contact a stop (possibly on a complementary alignment component) on the complementary connector as the connector is urged into mechanical engagement with the complementary connector; rigidly disposed in a fixed arrangement with the first connector component; the second biasing component being configured in use to urge the first optical component towards the first connector component once the alignment component contacts the stop.

The optical connector may be configured such that the stop forms at least part of a second alignment component on the complementary connector; the first and second alignment components being configured to cooperatively guide the optical connector into alignment with the complementary optical connector as the said optical connectors are urged into mechanical engagement.

The optical connector may be configured such that the: first alignment component comprises at least one narrowing tapered portion substantially converging towards the direction of connector engagement.

The optical connector may be configured such that the said tapered portions are parallel to the opening direction.

The optical connector may comprise a housing, the housing configured, upon mechanical engagement of the connectors, to at least partially surround the complementary optical connector before the first cover is urged from the first to the second position.

The optical connector may comprise a first optical component.

The optical connector may be configured such that the first optical component comprises an optical ferrule.

The optical connector may be configured such that the optical ferrule is an MT ferrule.

The present inventors have found that external optical assemblies have difficulty coupling to optical waveguides internally incorporated within a layer within a Printed Circuit Board (PCB).

A PCB board may comprise one or more supporting/protective outer layers surrounding and overlaying the waveguide layer. There may also be further internal cladding layers surround the waveguide. For purposes of this discussion the alignment axis in the plane of the PCB shall be termed 'horizontal' and the corresponding axis perpendicularly running through the plane of the PCB shall be termed as 'vertical'.

The PCB surfaces available to the external optical assembly to mechanically contact and align upon are therefore normally one of the outer surfaces of the PCB supporting layers. These 'available' surfaces do not directly correspond to the vertical waveguide alignment level. Variations in manufacturing processes may yield different thicknesses of any one or more of the layers between the outer mechanical contact surface and the PCB waveguide. Each variation in PCB layer thickness contributes to increased probability of alignment errors when using the contact surface as an alignment reference point.

According to a fifth aspect there is provided:

A printed circuit board, PCB, suitable for supporting and optically coupling to an external optical assembly, the PCB comprising: a first outer support layer; an optical layer comprising: a first planar cladding surface substantially parallel with and facing towards the first outer support layer; a cladding material comprising an optical waveguide bordering the first planar cladding surface; a first recess configured to extend through the first outer support layer, optical waveguide, and at least partially through the optical layer; a second recess configured to extend through the first outer support layer and expose a portion of the first planar cladding surface.

By exposing a portion of a surface of the optical layer and having the cross section of the optical waveguide border the cladding surface, an external optical assembly may mechanically contact the exposed portion of the said cladding surface and use that contact level as a vertical alignment reference that directly corresponds to a cross sectional extremity of the waveguide. This allows for direct correlation between the vertical level at which the external optical assembly contacts the cladding and the vertical level of the waveguide, which in turn provides increased accuracy in vertical optical alignment between the PCB optical waveguide and the external optical assembly. Manufacturing and assembly yields may therefore be improved.

An external optical assembly may comprise, but is not limited to, an optical component (either singular or an array of optical components) or an optical component mounted upon or otherwise supported or accommodated by one or more further devices or components such as an alignment plug or a sub-mount. The optical component may comprise an optical ferrule, for example an optical MT ferrule.

Furthermore, in this fifth aspect there may be provided in any suitable combination the following:

The printed circuit board may be configured such that the optical waveguide: substantially extends longitudinally in the plane of the optical layer; extends into the optical layer from the first planar cladding surface.

The printed circuit board may be configured such that the first outer support layer comprises an outer planar surface.

The printed circuit board may be configured such that the second recess is configured to border or overlap the first recess in the plane of the PCB.

This configuration forms a combined or composite recess wherein the portion of the composite recess that extends at least partially through the cladding and waveguide is the first portion of the composite recess, corresponding to the first recess. A further portion of the composite recess adjoining the said first portion acts as the alignment reference surface. An external optical assembly may therefore at least partially sit upon or otherwise contact the exposed portion of the first planar cladding surface and extend laterally into or over the part of the first recess that extends through the cladding layer. This composite recess therefore provides the possibility of having the external optical assembly fully accommodated within the composite recess, allowing for a more compact PCB/external assembly arrangement without parts of the external optical assembly protruding proud of the outer planar surface of the first outer support layer.

The printed circuit board may be configured such that the exposed portion provides a reference surface for alignment of the optical waveguide and external optical assembly perpendicular to the plane of the PCB.

The printed circuit board may be configured such that the first recess is configured to accommodate at least part of the external optical assembly.

The printed circuit board may be configured such that the first outer support layer comprises an inner planar surface bordering the first planar cladding surface.

By having the first and second recesses extend through a single outer protective layer, the PCB is not only simpler to manufacture, but also allows for an improved combined PCB/external optical assembly arrangement. The external optical assembly may comprise an upper portion configured to sit perpendicularly proud of the outer planar surface of the PCB and extend outwardly beyond the horizontal borders of the second recess (and optionally beyond the horizontal borders), and a downwardly extending portion configured in use to reside within the second and first recesses that contacts the exposed cladding surface. Because there is only a single source of variability in the depth of the second recess by virtue of only having one layer between the cladding surface and outer planar surface, the outer surface of the PCB is more likely to align flush with the under-surface of the upper portion of the plug, which in turn helps prevent contaminants entering the recess though gaps between said flush portions degrading optical coupling.

The printed circuit board may comprise a second outer support layer comprising an inner planar surface facing the optical layer and the first outer support layer.

The printed circuit board may be configured such that the first and second outer support layers sandwich the optical layer.

The printed circuit board may be configured such that the first recess comprises a side wall extending through the cross section of the waveguide creating a waveguide coupling facet.

The printed circuit board may be configured such that the waveguide coupling facet is substantially perpendicular: to the plane of the PCB; and, to the longitudinal direction of the waveguide at the coupling facet.

The printed circuit board may be configured such that at least a portion of the sidewall extends: substantially perpendicular to the plane of the PCB; and, through the optical waveguide.

The printed circuit board may be configured such that the side wall comprises at least a ledge portion extending along a border between the first and second recesses and through the optical waveguide.

The printed circuit board may be configured such that the first recess extends through the printed circuit board.

By having a composite recess formed from the second recess overlapping the first recess whilst the first recess extends through the PCB, the compose recess allows for an accurate vertical reference alignment surface within the composite recess together with an opening at the underside on the PCB that allows access to components residing with the composite recess from the underside of the PCB. Such access may be used, for example, to interrogate or assess the optical coupling of the PCB waveguide to an external optical assembly, to affix components residing at least partially within the composite recess to other components.

The printed circuit board may be configured such that a longitudinal peripheral edge of the optical waveguide is coincident with the first planar cladding surface.

The printed circuit board may be configured such that the optical waveguide comprises a graded index waveguide formed within the cladding material.

The printed circuit board may comprise a plurality of optical waveguides, the first recess extending through the said plurality of waveguides.

Often, one or more optical components are mounted upon, a sub-mount to form an optical sub-assembly. The sub-mount of the sub assembly typically provides means, such as an alignment surface, to integrate the sub assembly to an external integration platform to form an integrated assembly. The platform may comprise a substantially planar board-like configuration typically formed from one or more planar layers. A preferred example of such a platform is a PCB, preferably a PCB as described herein.

The external platform is typically larger than the sub assembly, for example by having an in-plane width and/or breadth that is greater than the equivalent dimension of the sub-mount or sub assembly when integrated together. Other terminology may be used, including 'daughterboard' for the sub-mount and 'motherboard' for the platform.

In some circumstances, the platform may comprise one or more integrated optical components such as an optical waveguide. An integrated optical waveguide typical runs substantially longitudinal in the plane of the platform and is typically surrounded in cross section by one or more platform layers.

When integrating an optical sub assembly with the PCB so that the one or more platform optical components optically couples to the sub assembly optical component, a recess may be formed into the platform into which at a portion of the sub-assembly is accommodated. Often, the sub assembly and platform are bonded together using an adhesive material. The sub assembly and platform typically require a degree of active alignment before being securely bonded together. This type of optical alignment typically involves transmitting one or more optical signals from one of the platform or sub assembly optical components to the corresponding optical component and monitoring, in real time, the strength of the coupled signal as the assembling device or person is moving the integrated components relative to each other.

The present inventors have found that introducing such adhesive materials to the integrated assembly can be problematic during assembly. Adhesives can have different setting times upon application to the desired area. Optical devices with small optical output beams, such as high index contrast waveguides, may require longer periods of alignment in aligning to such smaller beam diameters. An adhesive that is introduced into or around the recess before the sub mount is put into position may start to bond prematurely before the active alignment is complete and also cannot typically be monitored after the sub assembly is put into position ready for active alignment. As the sub assembly is manipulated to align the optical components, the adhesive may migrate or spread out into undesirable areas.

The present inventors have discovered that providing one or more through holes into the sub-mount that, when the sub-mount is aligned with respect to the platform, can allow an adhesive to be introduced from an externally accessible through hole and flow through the through hole contacting the desired surface that require adhesion.

According to a sixth aspect there is provided:

An optical sub-mount suitable for: contacting a PCB comprising one or more PCB recesses, said one or more recesses comprising a sidewall extending into a PCB outer layer; and, supporting an optical component for optically coupling to a further optical component supported by the PCB; the sub-mount comprising: a first surface, second surface and third surface, the second surface angled in a different plane to the plane of the first surface, each of the first and second surfaces being configured to at least partially face at least one surface of the PCB when the sub-mount contacts the PCB, wherein at least one of the said PCB surfaces comprises the PCB sidewall; a through hole extending from the third surface through to the first and second surfaces.

As stated above, in principle, the PCB, in the sixth aspect, may be any platform, preferably comprising a substantially planar board-like configuration typically formed from one or more planar layers.

By having the through-hole have an exit aperture that coincides with different surfaces of the sub-mount, the adhesive that exits the through hole may contact and bond different areas of the PCB to provide a more secure, multifaceted, bond between the platform and the sub-mount. The present inventors have found that different contact surfaces may have different adhesion properties due to their formation, for example some surfaces are polished whilst some are etched. Therefore, forming an adhesive bond that contacts a plurality of surfaces of the same component may yield a more stable bond than a bond that just adheres to one.

Furthermore, in this sixth aspect there may be provided in any suitable combination the following features.

The optical sub-mount may be configured such that: the first surface is configured to at least partially face an outer facing surface of the PCB bordering the PCB recess sidewall when the sub mount contacts the PCB; the second surface is configured to extend into the PCB recess when the sub mount contacts the PCB.

By having the through-hole exit through sub-mount surfaces that face the recess wall and a bordering outer facing PCB surface, the sub-mount can bond to an outer recess ledge in a single adhesive bonding area that makes any required adhesive curing simpler to perform due to the single proximal locality of the bond.

The optical sub-mount may be configured such that the first and second surfaces share a common exit aperture of the through-hole.

By having the through-hole exit through a common aperture, the sub-mount may be formed more simply, the adhesive introduction is simplified and the adhesive bonding area is further localised.

The optical sub-mount may be configured such that the through-hole is sized to allow an adhesive material to flow through an aperture in the third surface and out of the first and second surfaces.

The optical sub-mount may be configured such that the first surface borders the second surface.

The optical sub-mount may be configured such that first surface is substantially perpendicular to the second surface.

The optical sub-mount may comprise a plurality of through holes extending at least through the first and second surfaces.

The optical sub-mount may be configured such that the first surface, second surface and through hole form an adhesive fixing area, the optical sub-mount comprising one or more further fixing areas each associated with corresponding further PCB recess sidewalls.

The optical sub-mount may comprise: a first body section comprising the first surface and configured to reside proud of the PCB outer layer; a second body section comprising the second surface and configured to extend into the PCB recess.

The optical sub-mount may be configured such that the sub-mount comprises a contact surface configured to contact a complementary contact surface of the PCB.

The optical sub-mount may be configured such that the sub mount contact surface is substantially parallel to the plane of the PCB when the sub-mount contacts the PCB.

The optical sub-mount may be configured such that the PCB recess comprises the PCB contact surface, the second body comprises the sub-mount contact surface.

The optical sub-mount may be configured such that the sub-mount contact surface faces directly away from the first body section.

The optical sub-mount may be configured such that the sub-mount contact surface comprises a protrusion extending outwardly from a bottom surface of the second body section that faces directly away from the first body section.

The optical sub-mount may comprise a third body section extending into the recess substantially in the facing direction of the of the sub-mount contact surface.

The optical sub-mount may comprise a plurality of sub-mount contact surfaces.

The optical sub-mount may comprise a sub-mount recess comprising a first outer aperture sized to accommodate the sub-mount optical component;

The optical sub-mount may be configured such that the sub-mount recess extends from the first outer aperture into the sub-mount substantially parallel to the plane of the PCB.

The optical sub-mount may be configured such that the sub-mount recess further comprises a second outer aperture at the opposite end of the sub-mount recess configured to allow an optical component residing in the recess to optically communicate with the further optical component supported by the PCB.

The optical sub-mount may be configured such that the second outer aperture is sized to prevent the optical component from passing through the further aperture.

The optical sub-mount may be configured such that the sub-mount comprises a first lateral contact surface opposite to the first outer aperture and substantially adjacent to the second outer aperture; the first lateral contact surface being configured to contact the optical component when the optical component is accommodated within the sub-mount recess.

The optical sub-mount may be configured such that the first lateral contact surface comprises one or more sub-mount alignment recesses configured to accommodate an alignment feature extending from the optical component. Such an alignment feature may be a guide pin.

The optical sub-mount may be configured such that the third body section comprises a second lateral contact surface configured to contact a further PCB recess sidewall when the sub-mount contacts the PCB.

The optical sub-mount may be configured such that the second lateral contact surface is laterally offset from the first lateral contact surface in a direction towards the first outer aperture.

The optical sub-mount may be configured such that the sub mount recess comprises a sidewall substantially perpendicular to the first outer aperture; the sidewall comprising a raised portion for contacting the optical component.

The optical sub-mount may be configured such that the raised portion comprises a substantially flat surface parallel to the sub-mount recess sidewall.

The optical sub-mount may be configured such that the raised portion extends longitudinally along the sub-mount recess substantially from the first outer aperture to the second outer aperture.

The optical sub-mount may be configured such that the raised portion is located substantially in the middle of the cross sectional width of the recess sidewall.

The PCB and optical sub-mount as previously described may be combined to form a combined integrated assembly wherein the external optical assembly as described by the description of the PCB comprises the optical sub-mount and optionally the sub-mount optical component.

According to a seventh aspect there is provided:

An integrated assembly comprising an optical sub-mount as previously described and a PCB as previously described.

In this seventh aspect there may be provided in any suitable combination the following features.

The integrated assembly may comprise an adhesive material contacting the PCB recess sidewall, the PCB outer surface, the first body, the second body and the sub-mount recess.

The integrated assembly may comprise a sub-mount optical component.

Preferably, the optical component supported by the PCB as described by the sixth aspect corresponds to the 'at least one waveguide' described in the fifth aspect.

Preferably, the first surface of the optical sub-mount is configured to face the first planar cladding surface of the PCB.

Preferably, the second surface of the optical sub-mount is configured to face a sidewall of the second recess.

Preferably, the exposed portion of the first planar cladding surface comprises the PCB contact surface.

Preferably, the second lateral contact surface of the optical sub-mount is configured to contact a sidewall of the first recess of the PCB.

In this configuration the planar cladding surface forms the bottom of the second PCB recess allowing the sub-mount to directly align to the vertical PCB waveguide level. Furthermore by having a bottom to the part of the PCB recess where the glue exits from the sub-mount through-hole, the invention allows for a first recess for housing different sized sub-mounts whilst having an interim ledge used for alignment. The ledge also helps prevent adhesive migrating from the adhesion areas and interfering with the optical coupling area because when the sub-mount is in an approximate final alignment position, the under-surface of the second body of the sub-mount may lie substantially proximal to the exposed portion of the PCB first planar cladding layer.

Furthermore, when the first recess of the PCB is formed all the way through the PCB, this ledge formed by the first and second PCB recesses also helps prevent adhesive falling all the way through the bottom of the first recess.

The integrated assembly may further comprise a socket disposed upon the PCB outer planar surface and at least partially covering a portion of the first PCB recess; the socket comprising: an elongated housing extending substantially perpendicularly away from the PCB outer planar surface and comprising a first aperture sized to accommodate an optical connector and an opposing second aperture residing substantially coincident with the PCB outer planar layer and sized to allow a further optical component to enter the socket through the PCB first recess.

The integrated assembly may be configured such that the further optical component is in optical communication with the optical component of the sub-mount.

The integrated assembly may be configured such that the optical connector comprises an optical connector as described in the present invention.

The integrated assembly may be configured such that the optical connector is configured to accommodate the further optical component.

The integrated assembly may be configured such that: the first recess extends through the printed circuit board; the assembly further comprising attachment means disposed on the opposing side of the PCB to the PCB outer layer, the attachment means configured to secure the socket to the PCB.

Embodiments of the present invention will now be described in detail with reference to the accompanying drawings, in which:

FIGS. 1a-1f show different views of two complementary connectors as described herein, wherein FIGS. 1a and 1b show two solid perspective views, FIGS. 1c and 1d show plan and side views with the internal components of the connector being visible, FIG. 1e shows a solid vertical section view through the two connectors and FIG. 1f shows a solid side view wherein the right hand connector comprises alignment flanges without an alignment spring.

FIGS. 2a and 2b show perspective views of a connector as described herein, wherein FIG. 2b shows the internal components of the connector as visible.

FIGS. 3a-3d show some of the internal components of the connector in FIGS. 2a/2b, wherein FIGS. 3c and 3d show an optical ferrule being accommodated by an optical mount.

FIGS. 4a and 4b show perspective views of a connector as described herein wherein, FIG. 4a shows the internal components of the connector as visible.

FIGS. 9a-9d show the integrated assembly of FIGS. 8a and 8b and a socket accommodating a connector, wherein FIG. 9d shows two such integrated assemblies on the same PCB optically coupled using PCB waveguides.

Optical connectors 2 are provided configured to accommodate one or more optical components 4 such as end connecting terminals for physical transmission media. For example, a connector 2 may accommodate any of one or more: optical transmission cables and/or transmission fibres, and/or waveguides; optical or optoelectronic components with optical inputs or outputs. The said one or more end terminals may comprise, but not limited to, an MT ferrule.

Devices for coupling to and from PCB waveguides 212 are also presented.

The intended uses for the connectors 2 as described herein may include, but are not limited to, the provision of optical power, optical signals, data communication, telecommunication systems, computing devices and systems.

An optical connector 2 is presented configured to accommodate an optical fibre MT ferrule. For the purposes of the present description, reference is made to an optical fibre or optical fibre array (single mode or multimode or any combination thereof) terminated by an MT ferrule. However, the connector 2 described herein may, in principle, be used to house/connect any number or type of optical components 4.

Figure 1A:
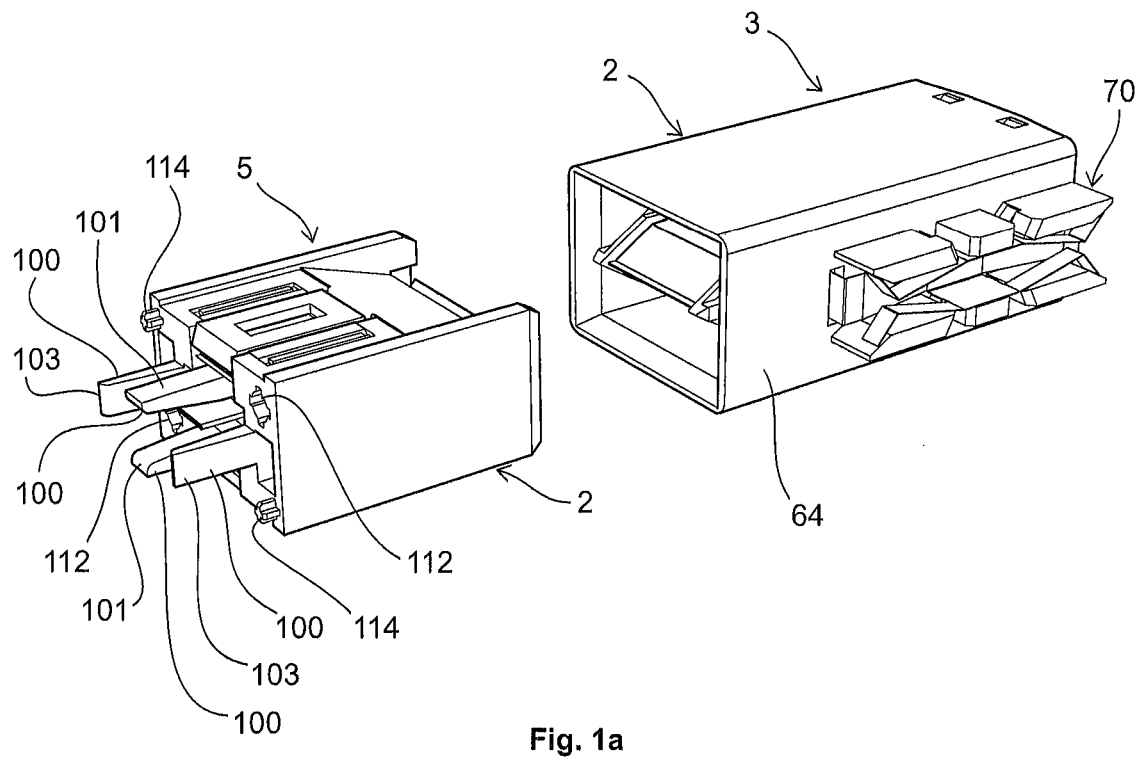
Figure 1B:
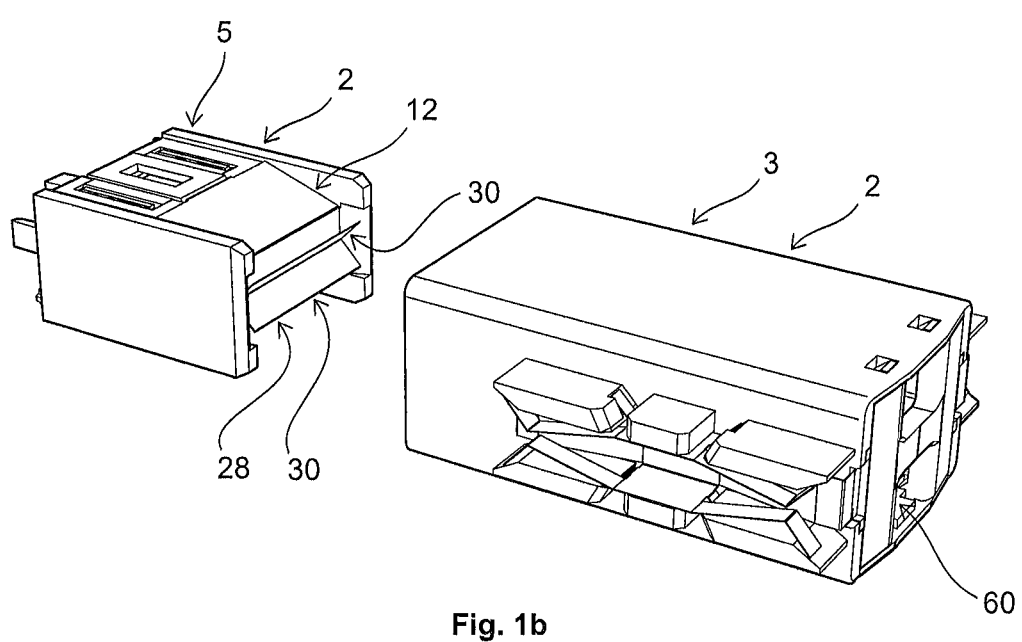
Figure 1C:
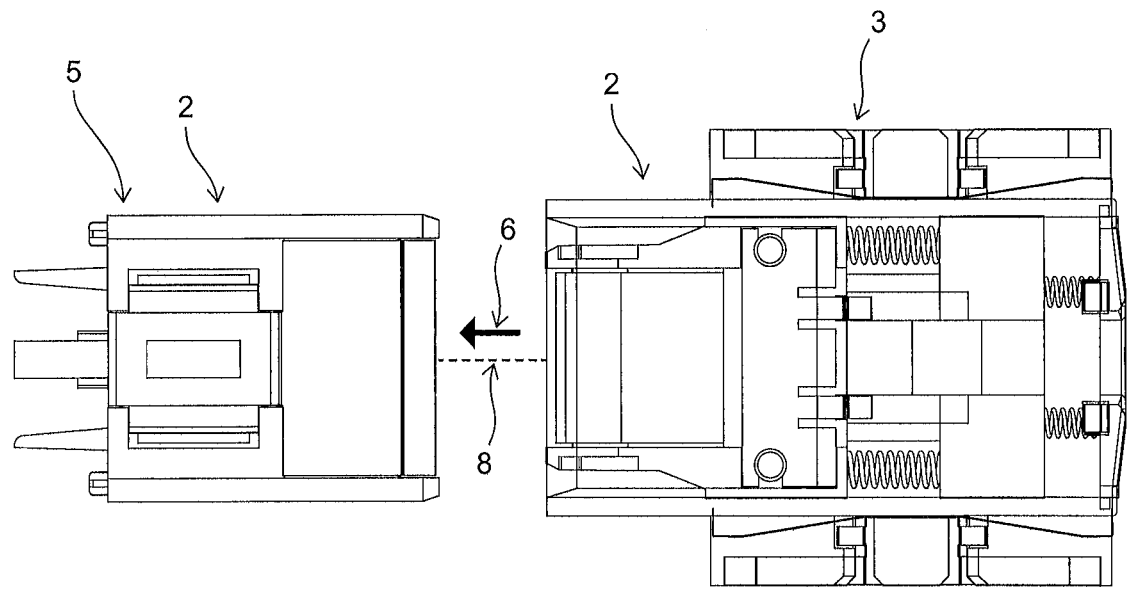
Figure 1D:
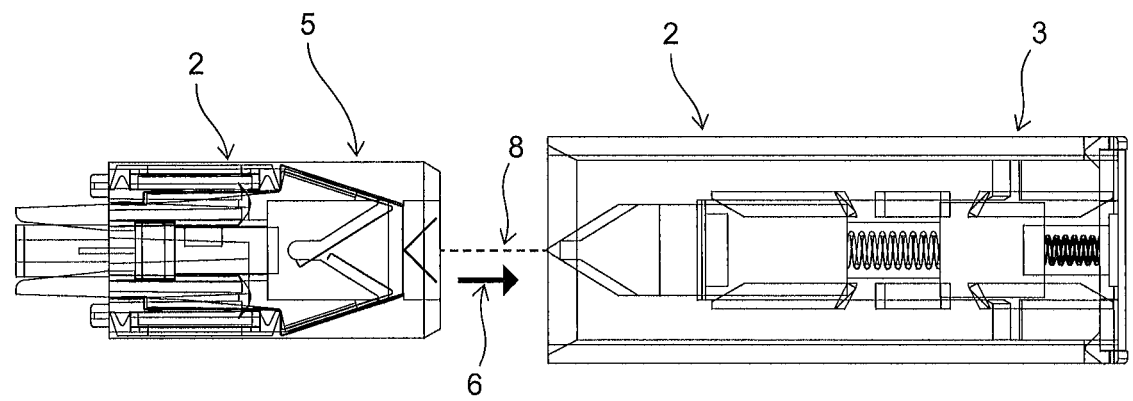
Figure 1E:
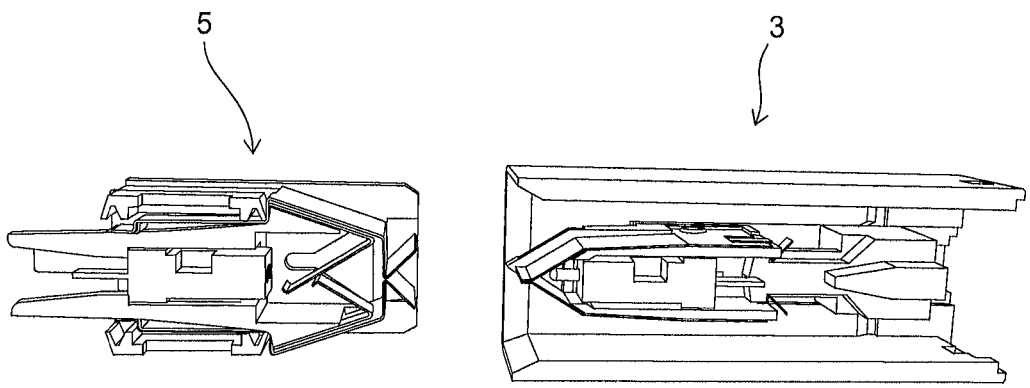

An example of two complementary connectors 2 is shown in FIGS. 1a-1d exemplified in the form of a plug 3 and a receptacle 5. Each connector 2 is arranged so as to be able to mechanically engage with another connector 2 with complementary features that allow for mechanical coupling. Two such engaging connectors 2 adjoin substantially in a direction of connector engagement 6 shown in FIGS. 1c and 1d. Each direction of connector engagement 6 is along an axis of optical connector engagement 8 as shown in FIGS. 1c and 1d whereby the said direction of each respective connector 2 is pointing in the opposite direction to the corresponding direction of the complementary connector 2. Preferably this direction is 'end on', such that the direction is substantially parallel to the optical communication path 10, as shown in FIG. 5b, of each connector 2. For example, when coupling two complementary connectors 2, both carrying optical fibres, the optical communication paths between the two connecting fibres would normally be substantially along the longitudinal (propagating) direction of the terminal portion of the fibres held in the connectors 2. This allows for fibre to fibre, end facet, butt coupling.

Throughout the specification reference may be made to the top, bottom, side, back and front of a connector 2. These definitions are intended as being non-limiting in absolute connector orientation from an external standpoint. For reference purposes, 'the sides' are the nominally horizontal facing wall/s of the connector 2 that also face perpendicularly away from the axis of the connector when disposed laterally flat upon a mounting surface. The front of the connector 2 is nominally the wall/s where the connector 2 engages with another complementary connector 2 typically facing the direction of the connector engagement 6. Typically the front of the connector coincides with where the optical communication for a butt-coupled optical component 4 occurs. The back of the connector 2 is the opposing face/wall/s to the front and, for example, would commonly, but not necessarily, be the face which could comprise an exit aperture for any optical fibres emanating from the connector 2. The sides, top and bottom are those faces that typically form the cross sectional periphery of the connector 2.

Plug 3 and receptacle 5 are both examples of a connector and for this reason, although they share new and innovative features, they will each be described independently.

Plug

Figure 1F:
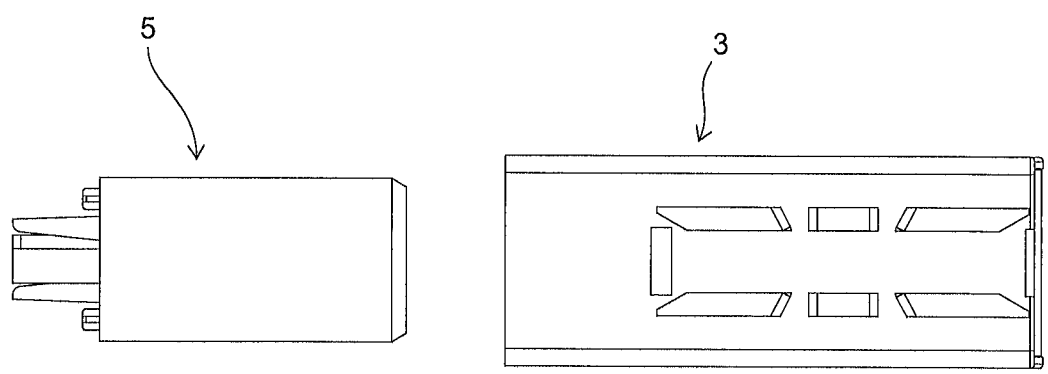
Figure 2A:
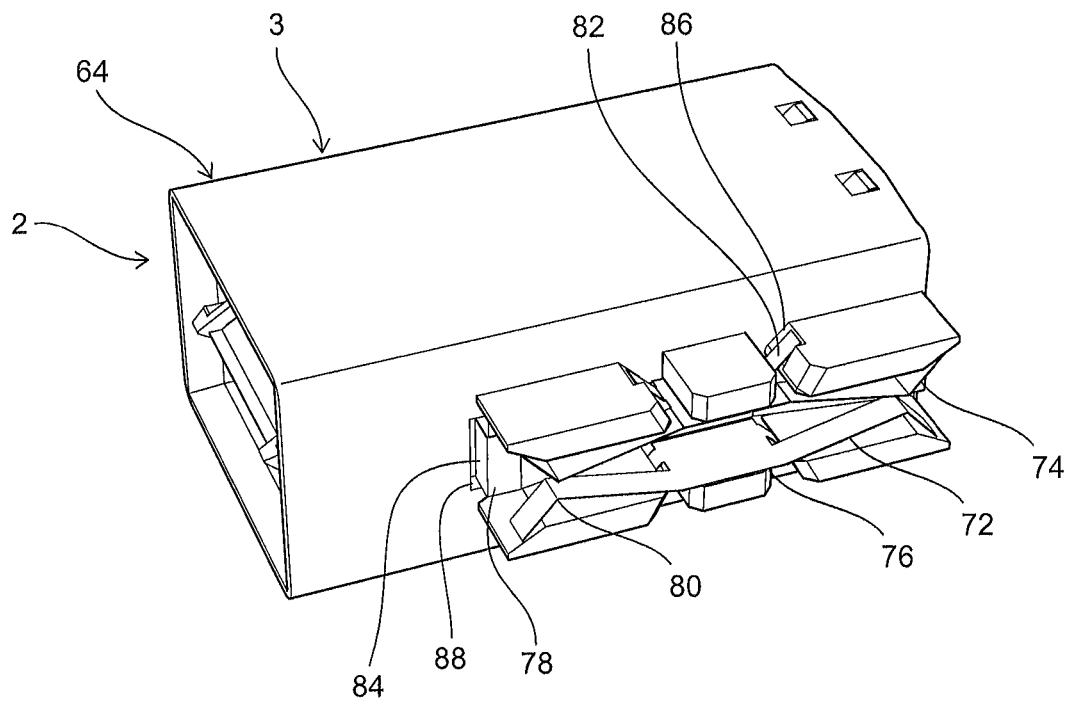
Figure 2B:
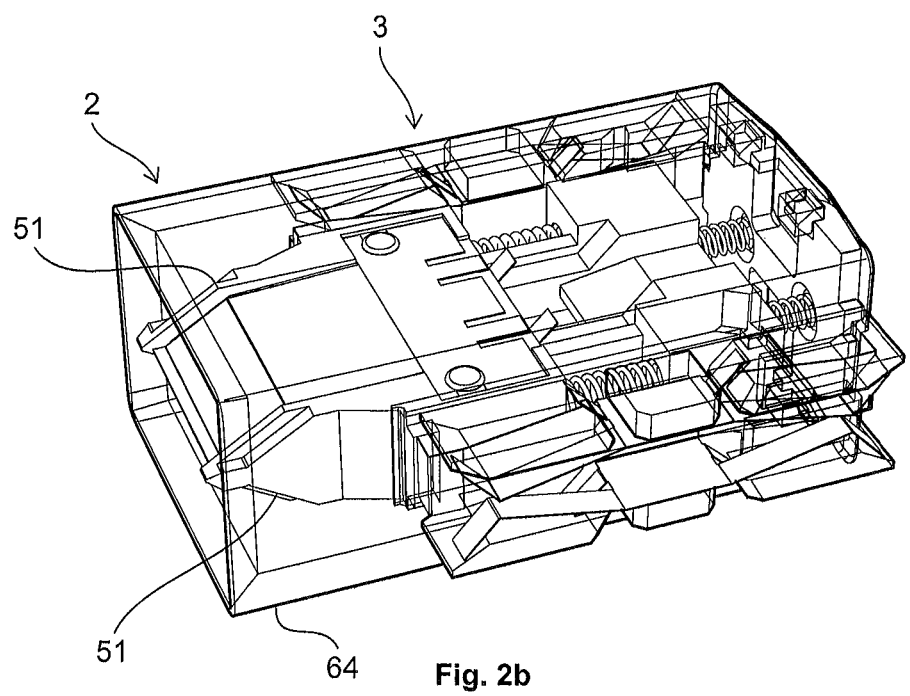
Figure 3A:
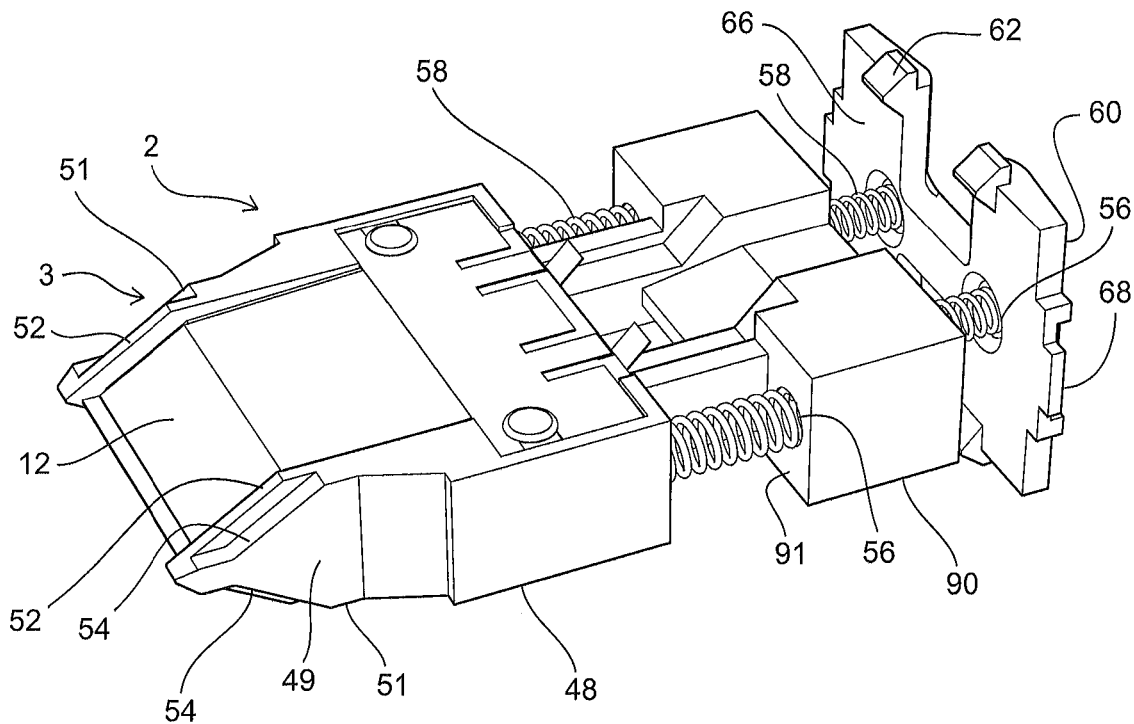
Figure 3B:
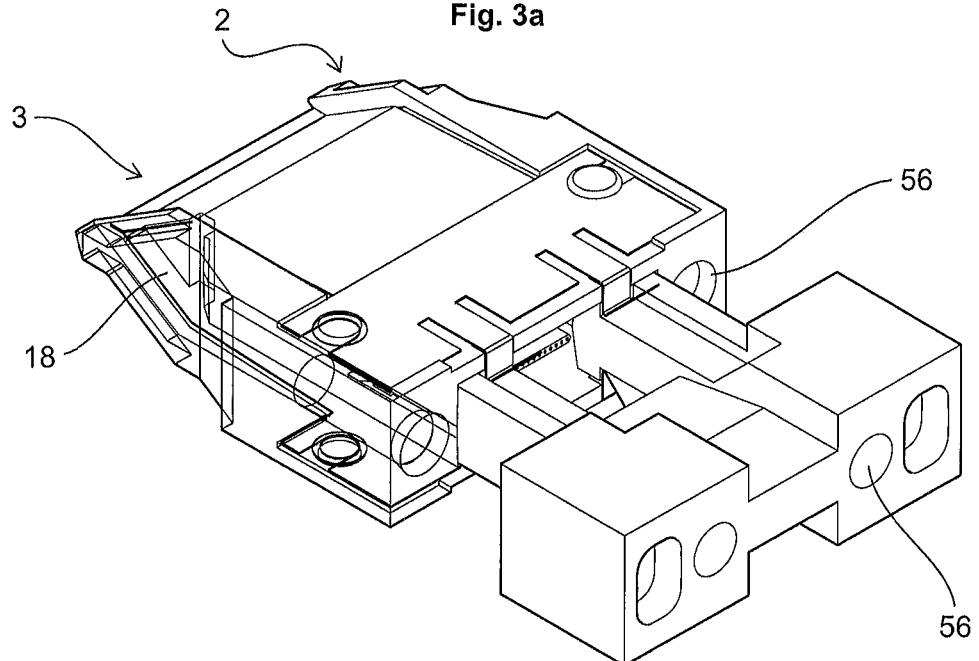
Figure 3C:
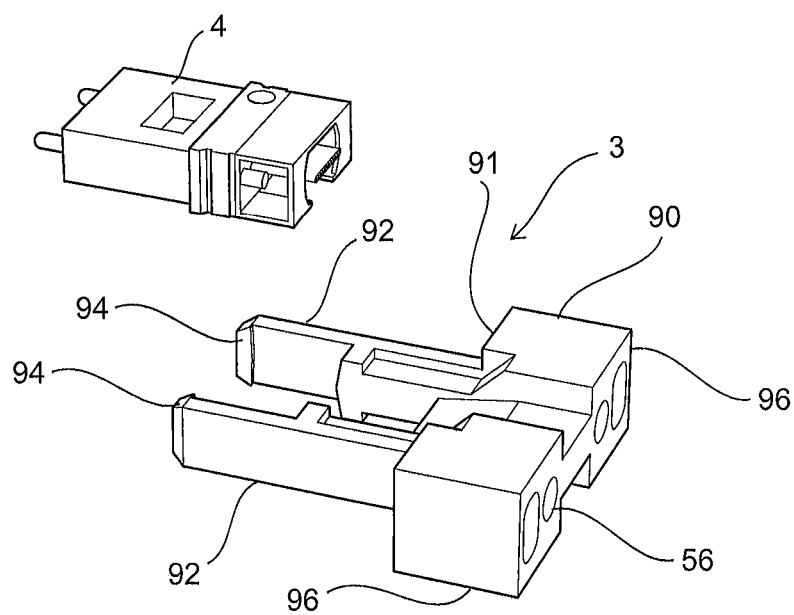
Figure 3D:
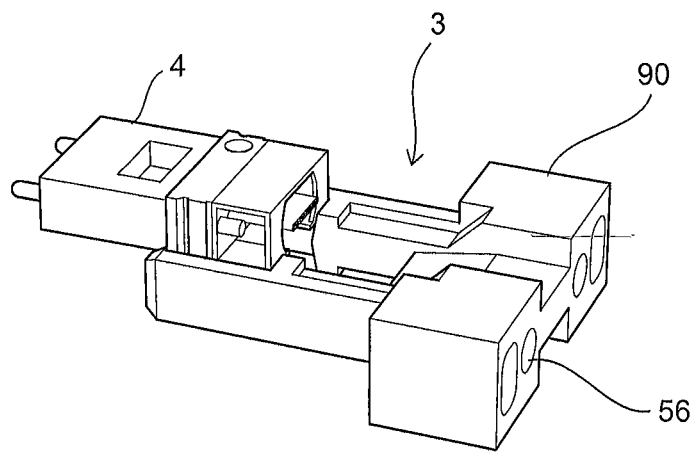
Figure 11:
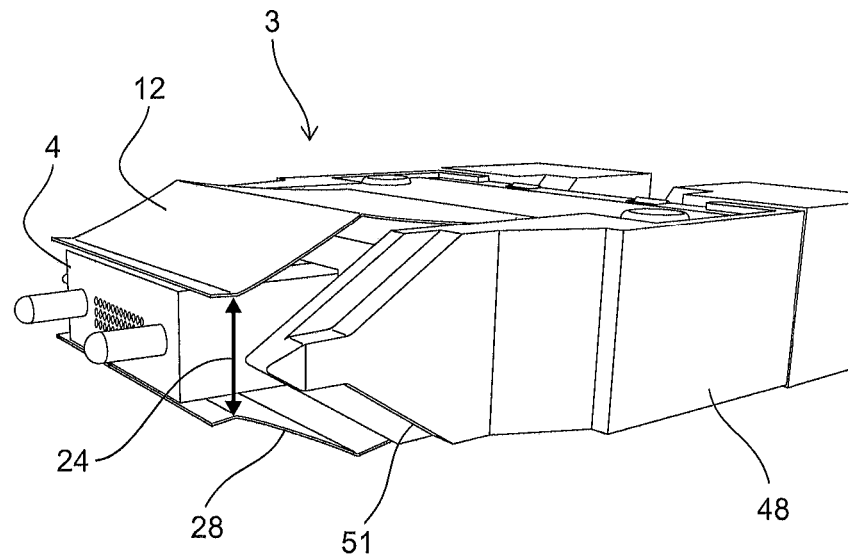
FIG. 11 shows a perspective view of a plug connector of the present invention where the optical component has been moved through a front engaging component to open the covers of the connector.

One example of a connector is shown in FIGS. 2a, 2b. This connector 2 is a plug 3 and is configured to engage with a receptacle 5 connector to be described in detail below. The plug 3 and receptacle 5 connectors are both shown in FIGS. 1a to 1f. FIGS. 3a and 3b show some of the components of the plug 3 without an outer housing 64, where FIG. 3b shows all components as visible. FIGS. 3c and 3d show how an optical mount 90 of the plug 3 secures an optical component 4 such as an optical MT ferrule. FIG. 11 shows the covers 12, 28 of the plug 3 being forced open by an optical MT ferrule protruding through the front engaging component 48 from inside the plug 3. Although an example of a plug 3 is now described, the plug 3 may in principle, be modified according to incorporate any suitable connector feature as described herein.

The plug 3 comprises a housing 64, a front engaging component 48, two covers 12, 28 labelled on FIG. 11, an optical mount 90, two biasing components 58 communicating between the front engaging component 48 and the optical mount 90, a back end component 60 and a further two biasing components 58 communicating between the optical mount 90 and the back end component 60.

The housing 64 comprises two sets of opposing alignment flanges 70 externally on each side wall. The alignment flange sets are vertically spaced from each other and accommodate and engage an alignment spring 72 residing between the two sets. The alignment spring 72 is used to secure the plug 3 to a mounting platform edge 71, such as an edge of a PCB. The spring 72 is further configured to provide the plug 3, when engaged with the mounting platform, with different degrees of freedom of movement about the platform to help accommodate minor misalignments between the plug 3 and receptacle 5.

The opposing alignment flange sets on the housing accommodate and engage with an alignment spring 72. Each alignment flange set comprises three separate flanges 70 protruding outwardly from the side wall at the same vertical level and horizontally spaced along the wall such. Two tabs 82 of the alignment spring 72 extend between the flanges 70 in each set. Each tab 82 of the alignment spring 72 biases into an indented surface portion 86 of each end flange 72 of the said set so that the spring 72 is prevented from coming away and disengaging from the alignment flanges 70.

As shown in FIGS. 2a and 2b, each alignment spring 72 is formed of 3 elongated spring 'strip' portions 74, 76, 78 joined in a parallel configuration about the centre of the elongate length. The spring 72 is made from sheet metal that is cut and folded into shape. However in principle any suitable resiliently biased material may be used.

The first and second spring portions 74, 76 are adjoined either side of the third spring portion 78, and folded at an approximate 90 degree angle relative to the third spring portion 78 so that first strip faces the second strip and in cross section the spring 72 resembles a flat bottomed U shape. The flat bottomed part of the U corresponds to the third strip 78 and lies adjacent to and parallel with the housing sidewall such that the strip width runs along between two sets of alignment flanges. When the plug 3 is fitted onto the platform 200, two parallel platform edges 71 pass along and through the alignment spring 72 between the first and section strips 74, 76.

Each strip 74, 76, 78 comprises fold lines along the elongate length of the strip creating biased inclining and declining surfaces joined by an apex 80 fold that protrudes towards the middle of the spring cross section. Two such apexes 80 are located near the ends of each strip and may temporarily flatten out and return to the nominal apex shape as features of the platform 200 are passed over each apex 80. In one example, not shown, the platform 200 comprises a raised feature proximal to each engaging platform edge 80 that is positioned to pass over one of the apex folds of the first or second spring strips 74, 76 on each alignment spring 72. Once the raised portions are located between the apexes 80 on the same strip, the plug 3 is secured to the platform 200. Additionally or alternatively the platform engaging edges 71 may comprise laterally extending engaging protrusions 73 that are positioned to pass over an apex on the third strip 78 and secure the plug 3 by locating the protrusion between the apexes 80 of the third strip 78.

The front engaging component 48 comprises two alignment components 51 and is moveable about the plug 3 connector along the axis of connector engagement 8. The optical mount 90 is further moveable about the plug 3 connector along the axis of connector engagement 8. Two springs act as biasing components 58 that reside between and contact the optical mount 90 and the front engaging component 48. The springs resiliently bias the front engaging component 48 away from the optical mount 90.

In principle, each of the above components of the plug 3, or the plug 3 itself, may be modified in any suitable way as substantially described herein.

The front engaging component 48 of the plug comprises a front engaging section having top and bottom sections and two opposing side sections 49 spaced apart by a top and a bottom cover 12, 28. The covers are formed from a thin metal sheet, however in principle any suitable sheet material may be used. Each cover 12, 28 is moveable about a fold line adjacent to a substantially flat anchoring portion. The anchoring portion lies in contact with, and is secured to, a respective outer surface of the top/bottom section of the front engaging component 48. The covers move from closed to open position to create an opening 24 as shown in FIG. 11, through which the internally accommodated optical component may protrude through as shown in FIG. 11.

Each cover 12, 28 comprises an inclined section, which in the closed position, converges forwardly in the direction of connector engagement 6 with the other cover 12, 28 to a meeting point substantially in the vertical centre of the front engaging component 48 and substantially co-convergent with first and second tapered sections as now described.

The side sections 49 of the front engaging component 48 are substantially symmetrical about the vertical plane intersecting the axis of connector engagement 8. Each side section 49 comprises a substantially vertical panel extending forwardly in the direction of connector engagement 6 wherein the top and bottom edges of the panel forwardly converge to form a first tapering portion 52. This taper is a linear taper but could in principle be any other suitable tapering shape. The side section 49 is used as a forward pushing portion to open similar covers 12, 28 on the receptacle 5 connector as described herein.

The side sections also each comprise an alignment component 51 extending in thickness laterally and horizontally outward from the first tapering portion. The alignment component 51 comprises a second tapered portion 54 running substantially parallel with the first tapered portion 52 of the side section 49 and having a top vertical alignment surface and a bottom vertical alignment surface that extend and converge forwardly (parallel to the direction of connector engagement 6).

The said top and bottom alignment surfaces of the second tapered portion 54 then run forwardly until they coincide with the corresponding surfaces of the first tapered portion 52. The alignment component 51 therefore comprises top and bottom alignment surfaces that act, in use, to guide the front engaging component 48 into a mating configuration as the connector 2 is pushed into physical engagement with the other receiving complementary receptacle 5 connector, whereby the top and bottom alignment surfaces contact and fit complementary top and bottom alignment surfaces of the other receptacle 5.

Each alignment component 51 comprises a substantially flat and vertical sidewall that forms the outer facing surface of the forwardly extending side section 49. The said sidewalls act together to facilitate horizontal lateral alignment of the front engaging component 48 when the outer vertical surfaces contact a complementary surface of the receiving connector 2.

Referring to FIGS. 3c and 3d, the optical mount 90 comprises two longitudinally extending grips 92 that run parallel and forward in the direction of connector engagement 6, each terminating in an inward hook 94. The grips 92 are formed of a suitable material that provides resilient biasing so that an optical component 4 (with complementary features for the hooks to engage upon) may be snap fit between the two grips 92. Preferably, the distance between the inner facing surfaces of the grips 92 corresponds to the width of the portion of the optical component 4 captured between the grips 92.

The optical mount 90 further comprises two side flanges 96 each extending outwardly and laterally proud of each proximal grip 92. Each side flange 96 comprises a front facing vertical surface, as shown in FIG. 3a, wherein each surface comprises a cylindrical depression 56 to at least partially house a first biasing component 58 is. In this example the biasing component 58 is a spring.

The back end component 60 comprises a substantially forward facing vertical rectangular back panel section 66 with laterally and vertically extending through cut-outs that allow optical fibres or other physical communication media to pass through. Four lugs 62 are provided to snap fit the back end component 60 to the housing 64. The back panel (or back section) 66 further comprises one or more stops 68 outwardly extending in the plane of the back panel. The said stops 68 having a front surface operative in use to contact a corresponding back facing surface portion of the housing 64, to prevent the back end component 60 from travelling forward into the housing 64.

The back end component 60 further comprises two cylindrical depressions 56 extending backwardly into the front surface of the back panel. Said depressions 56 are spatially separated about the plane of the back panel from the trough cut-outs. Each depression 56 is configured to accommodate at least an end portion of one of the spring biasing components 58 that resiliently biasing the back panel away from the optical mount 90.

The two back end component depressions 56 are vertically level and horizontally separated about the back panel.

The back facings of the front engaging component 48 and the optical mount 90, as shown in FIG. 3b, comprise cylindrical depressions 56 also sized to at least partially accommodate a portion of the biasing components 58 biasing the said front engaging component 48 against the said optical mount 90; and the said optical mount 90 against the said back end component 60.

The housing 64 comprises a substantially rectangular cross sectional body with side walls, a top wall and a bottom wall. The walls define a peripherally enclosed channel with a back end opening through which the back end component 60 can at least partially be inserted into, and a front end opening forwardly disposed from the front engaging component 48 and covers 12, 28 when the connector covers 12, 28 are in the closed position (i.e. a front portion of the housing 64 overhangs the front engaging component 48 and the covers 12, 28 when the covers are in closed position).

The front housing opening is sized to allow the complementary connector 2 to enter the housing 64 from the front.

Receptacle

Figure 4A:
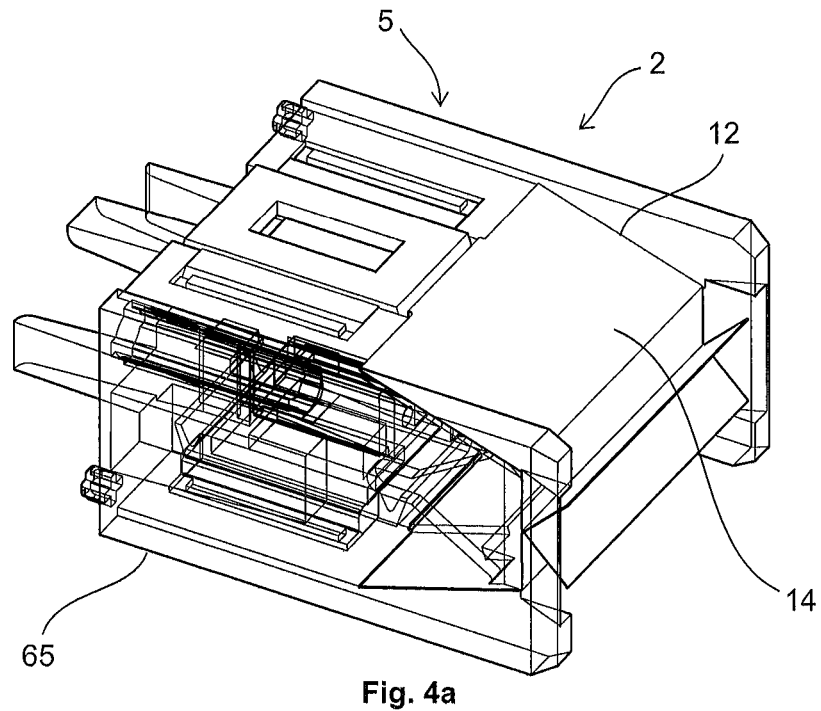
Figure 4B:
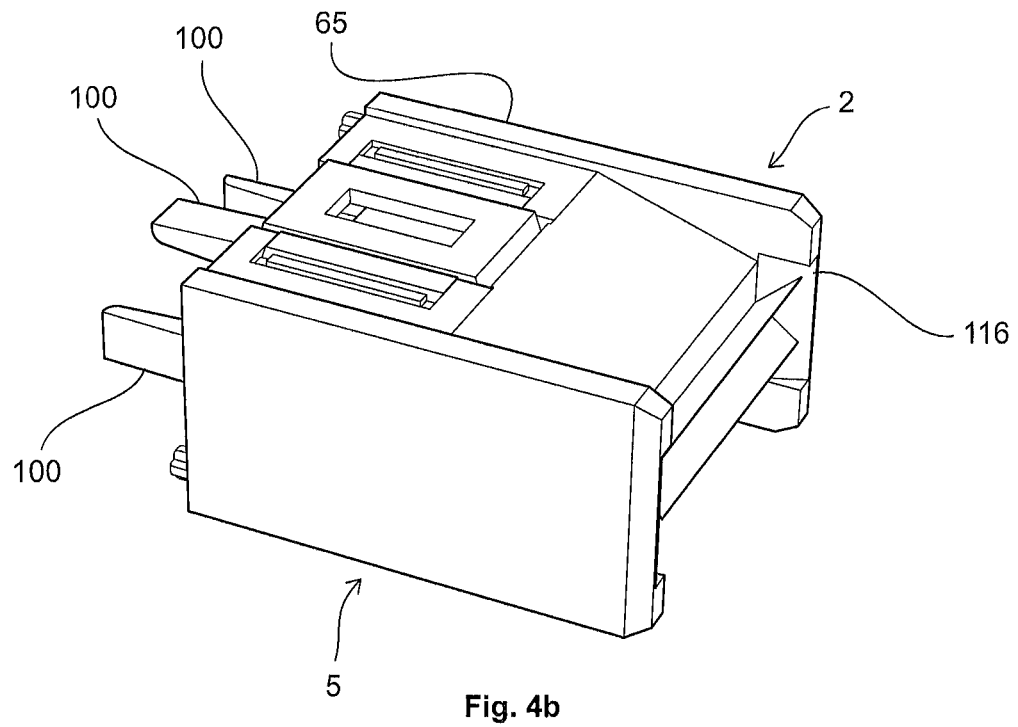
Figure 5A:
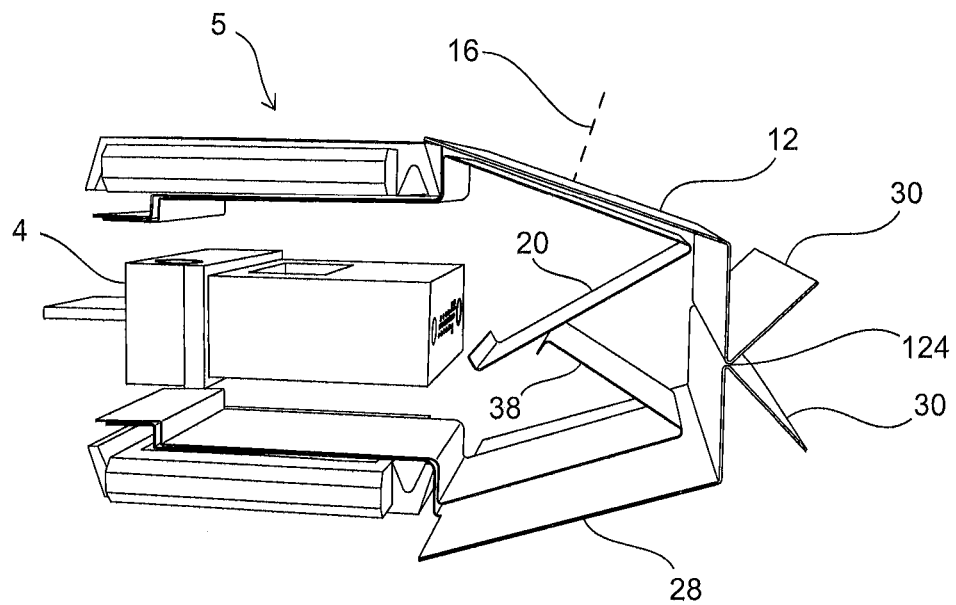
FIGS. 5a-5c show different perspective views of some of the internal components of the connector of FIGS. 4a and 4b.
Figure 5B:
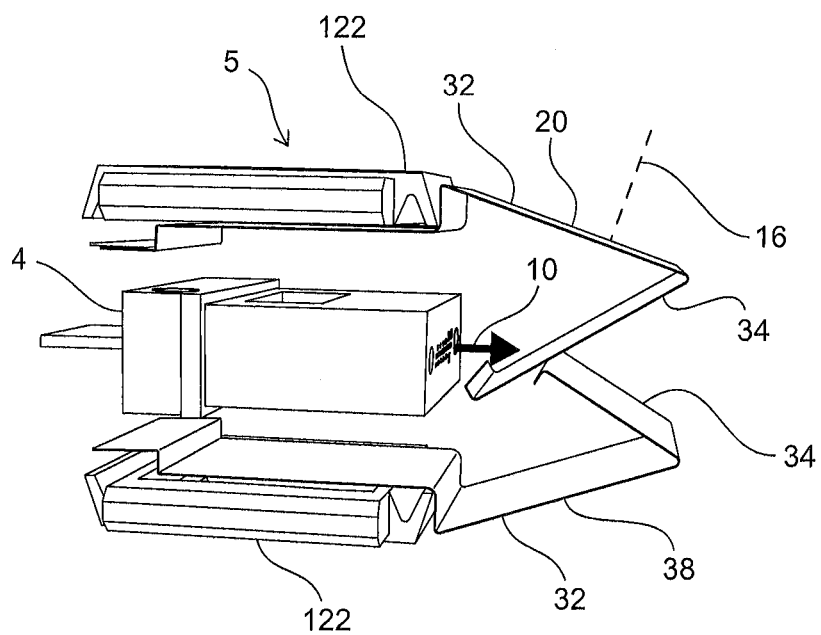
Figure 5C:
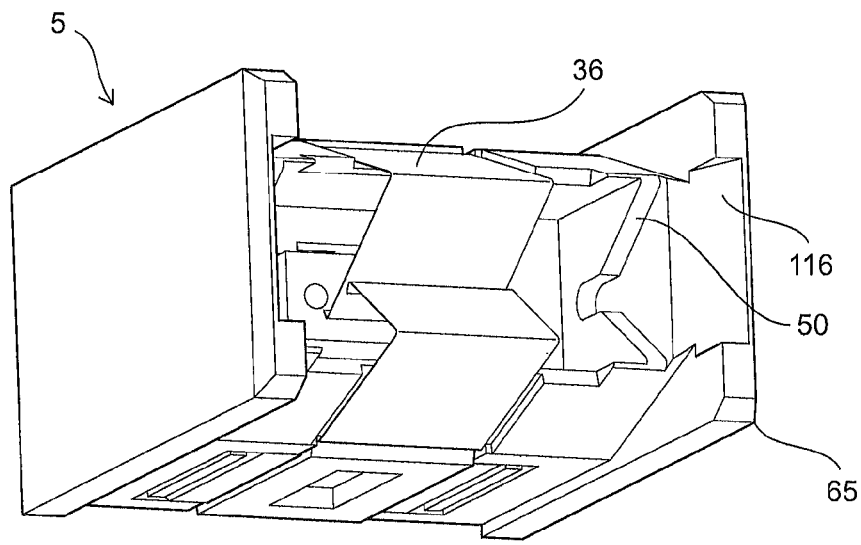

In another example of the present invention, the connector 2 is a receptacle 5 as illustrated in FIGS. 4a and 4b, 5a to 5c and FIG. 12. The receptacle 5 comprises a housing 65, two covers, two shields 20, 38, two cover retaining clips and two alignment components 50 on the sides of the housing. FIG. 4a also show an optical component 4 housed in the receptacle 5. FIGS. 5a-5c show certain components of the receptacle 5 including an optical MT ferrule which it is carrying. In principle the receptacle 5 may accommodate any suitable optical component, which may be replaceable. FIG. 5a shows the internal components without the housing 65. FIG. 5b shows the same components of 5a but without the covers 12, 28, whilst FIG. 5c shows the components of the connector 2 including the housing 65, but without the covers 12, 28.

In principle, each of the above components of the receptacle 5, or the receptacle 5 itself, may be modified in any suitable way as substantially described herein. Preferably the receptacle 5 has a length running from the back of the housing (excluding any alignment stubs 114) to the front of the housing, of between 10 mm-25 mm, more preferably between 15 mm-20 mm, more preferably approximately 18 mm. The receptacle housing height is preferably between 8 mm and 11 mm, more preferably 9-10 mm, more preferably 9.5 mm. The receptacle housing width is preferably between 12-18 mm, preferably between 15-16 mm, more preferably approximately 15.5 mm.

Figure 10A:
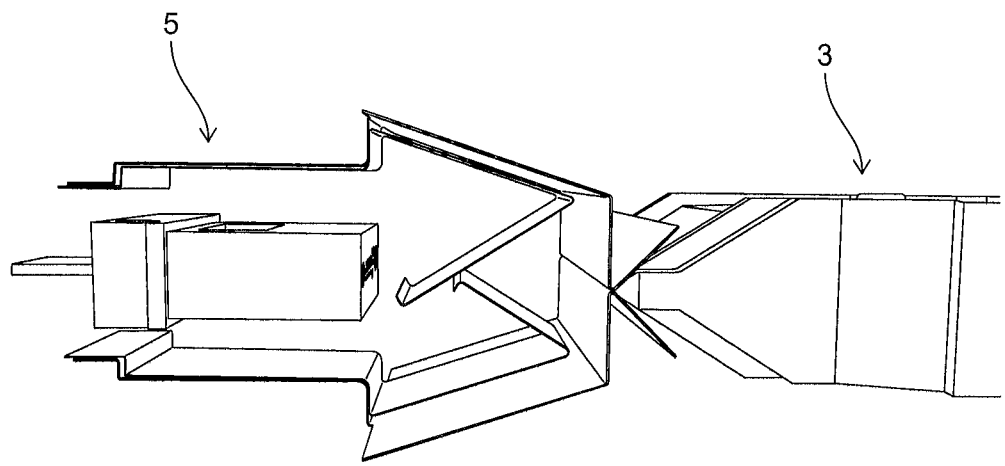
FIGS. 10a-10e show close-up views of the engaging connectors of FIGS. 6a-6h.
Figure 10B:
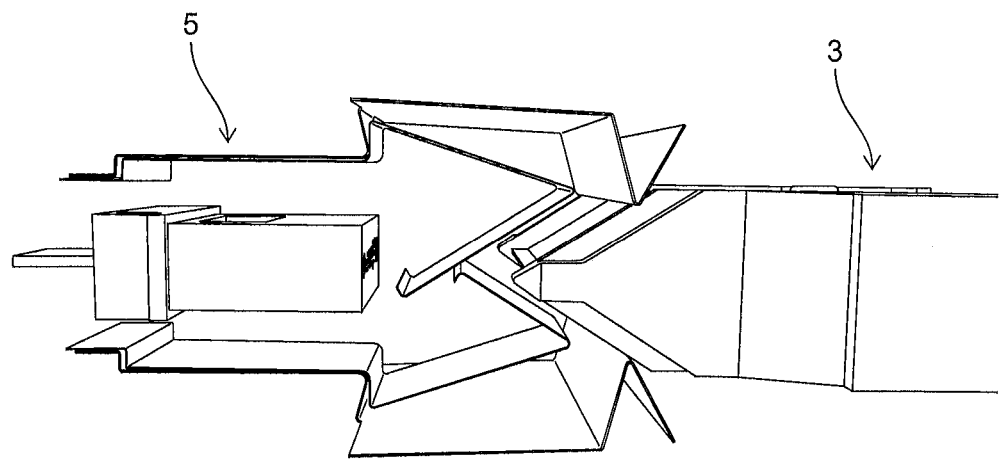
Figure 10C:
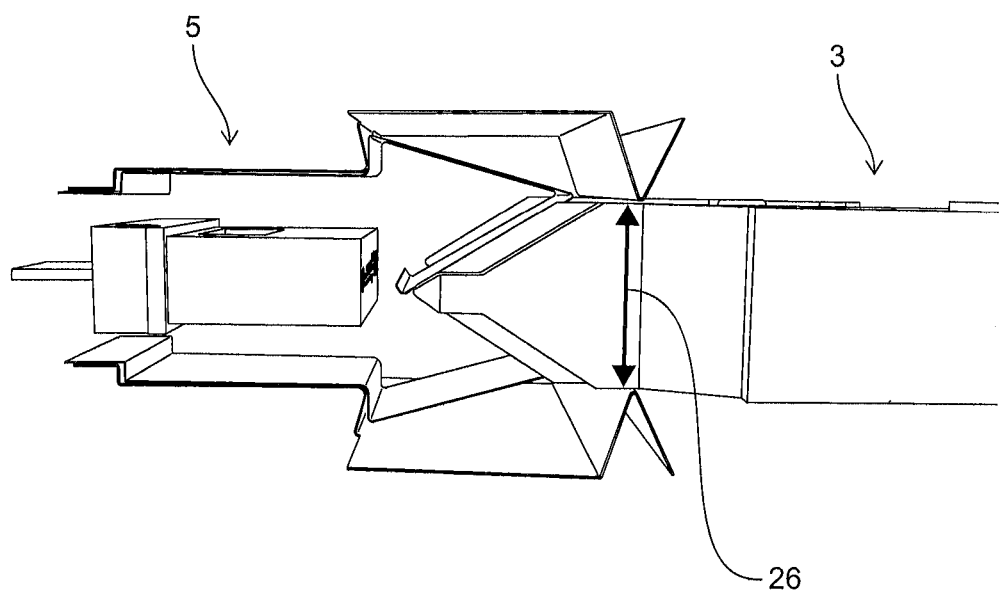
Figure 10D:
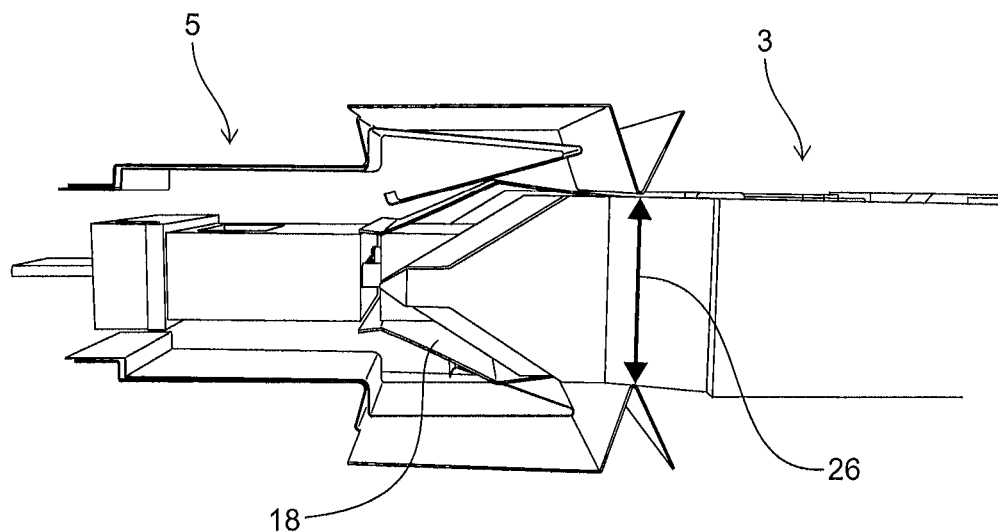
Figure 12:
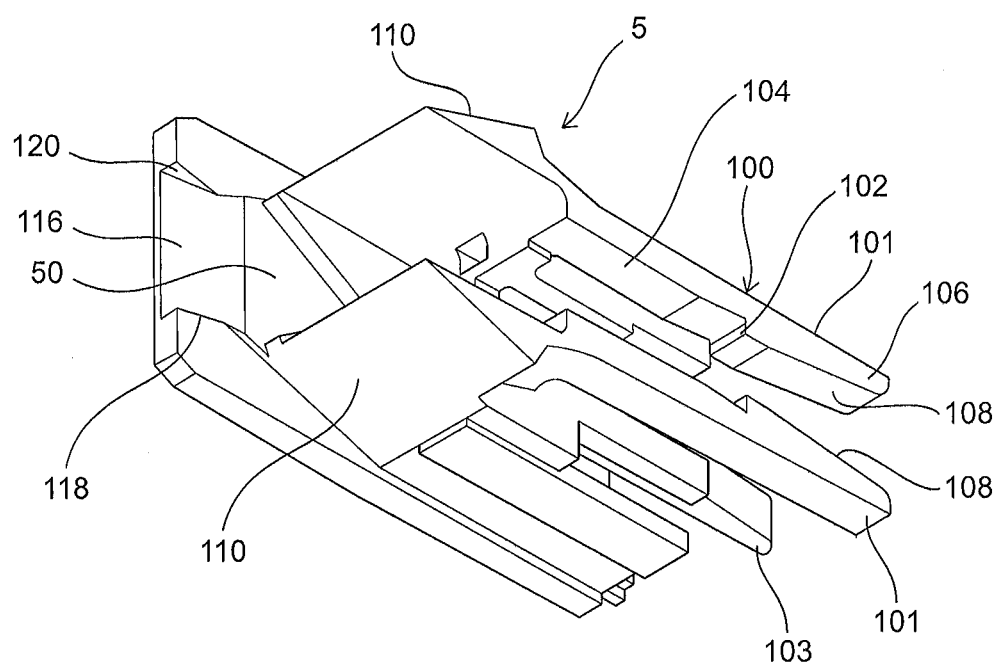
FIG. 12 shows a perspective view through the cross section of the housing of a receptacle connector.

The housing 65 is formed in one section, but in principle could be multiple sections coupled together. The housing 65 comprises a back section comprising a substantially rectangular cross section, a top wall, a bottom wall and two opposing sidewalls. The optical component optically communicates through a front opening 26 created by the opening of the receptacle covers 12, 28 as shown in FIG. 10d. The back of the back section comprises another opening through which four lugs 100 protrude and extend substantially perpendicularly outward and away from the back of the housing 65 as shown in FIG. 4a and FIG. 12, wherein FIG. 12 only shows three of the said four lugs 100. Two of the four lugs are snap fitting locking lugs 101 whilst the remaining two lugs are guide lugs 103.

The opening also allows for the insertion of the optical component into the receptacle 5 between the four lugs 100. Each snap fitting locking lug 101 is a resiliently biased elongated finger comprising a substantially square or rectangular cross section with a substantially flat inner surface facing towards the middle of the receptacle 5, an opposite outer facing surface and two adjoining side surfaces. Each lug 100 resides partially within the receptacle housing 65, extending out the back of the receptacle housing 65 and is formed integrally with the housing 65. In principle however the lugs 100 may be formed separately to the housing 65. Each lug 100 has its outer facing surface aligned substantially parallel with a different one of the top, bottom or side walls of the receptacle housing 65, thus making two side lugs, a top lug and a bottom lug. The top and bottom lugs 100 are snap fitting locking lugs 101, the side lugs 100 are the guide lugs 103. When a rectangular optical MT ferrule is inserted and secured between the four lugs 100, a portion the inner surface of each lug 100 contacts a different side of the ferrule.

As shown in FIG. 12, each snap fitting locking lug 101 comprises a front section 104 residing within the housing 65 that is sized to accommodate the optical component 4. The front section 104 of the locking lug 101 joins a back section 106 via a lip 102 that acts to secure the optical component in the receptacle 5 by providing a back end stop upon which the back of the optical component contacts when the optical component is fully inserted in the receptacle 5. The back section 106 of each locking lug 101 comprises a longitudinally tapered inner surface 108, running from the back terminal end of the lug to the lip 102, acting to funnel and guide the optical component in between the lugs 100 as it is urged into the receptacle 5. The guide lugs 103 also comprise a similar longitudinally tapered inner surface. Upon insertion of the optical component between the lugs 100, each locking lug 101 deflects and move directly away from the opposing locking lug 101 to allow the optical component to enter the front section 104 as the said optical component is pushed into the receptacle 5. Once the optical component has been inserted into the front section 104, the locking lugs 101 snap back to the nominal un-deflected position such that back end stop of each lip 102 is in contact with the back of the optical component.

The back end stops prevent the optical component from moving backwardly out of the receptacle 5 once inserted. Conversely, each side guide lug 103 may comprise a front end stop surface that is positioned to contact a forward facing surface of the ferrule and stop the optical ferrule from moving further into the receptacle 5. The front and back end stops therefore secure the optical ferrule in the receptacle 5. In principle, the front and/or back end stops can be located on any one or more of the lugs 100, preferably at least on a pair of opposing lugs. The ability of the locking lugs 101 to move and prise apart further allows a degree of pivoting movement for the optical component, when in inserted position, to facilitate the best mating fit to a connecting ferrule of a complementary connector.

The top and bottom walls of the back section of the receptacle housing as shown in FIGS. 5c and 12, both comprise forwardly inclining portions 110 that incline towards each other and terminate before joining to form an opening through which the ferrules can optically communicate. Each inclined portion 110 is configured to reside underneath the adjacent shield 32, 38 and cover 12, 28 when the said shield 32, 38 and cover 12, 28 are in closed positions. The shield 32, 38 may contact the outer surface of the inclined portion when in closed position.

As shown in FIG. 1a, the back wall of the housing 65 further comprises two screw fixing holes 112, preferably spaced in diagonally opposed corners about the back wall, for fixing the receptacle 5 to a mounting platform such as a PCB 200. In principle however, any other suitable fixing means may be used any number of fixing means may be used such as one or a plurality of screw holes 112.

The back wall of the housing further comprises two backwardly protruding alignment stubs 114 preferably spaced in diagonally opposed corners about the back wall, that fit, preferably flushly, into complementary shaped holes in the mounting platform 200. Preferably these stubs 114 have a cross sectional shape resembling a plus sign (+).

The mounting platform 200 also preferably comprises an aperture, for example a through hole or depressed sized to accommodate the backwardly protruding lugs 100.

As shown in FIGS. 5c and 12, the housing 65 further comprises two funnelling alignment components 116 that serve to funnel the front engaging component 48 of a complementary connector 2 (such as a plug 3) into mating engagement 6. Each funnelling alignment component 116 forms a sidewall portion of the housing 65 extending outwardly forwards from one of the side walls of the housing back section in a direction parallel to the direction of connector engagement 6. Each funnelling alignment component 116 comprise one or more inner surfaces that substantially face the corresponding opposite funnelling alignment component 116, and are spaced apart from the other alignment component 116.

Each funnelling alignment component 116 comprises an inwardly facing wall surface comprising a horizontally extending depression longitudinally tapering both backwards and inwards such that the depression converges to an un-depressed inner surface. The depression may be shaped to provide a first vertically narrowing taper commencing at the front edge of the funnelling alignment component 116 converging backwardly towards the back section of the housing 65. This first vertical taper provides an upwardly inclining substantially upwardly facing bottom guide surface 118 and a corresponding downwardly inclining substantially downward facing top guide surface 120. Alternatively the bottom 118 and top 120 guide surfaces funnelling alignment component 116 may not vertically incline, as shown in FIG. 5c.

The back portion of the housing 65 comprises two receiving alignment components 50 as shown in FIG. 5c, each forming at least an inner facing portion of a back section sidewall that is spaced apart from an opposing back section sidewall. Each receiving alignment component 50 comprises structural features configured to contact and engage complementary engaging features of a further complementary connector 2. Such a further connector 2 may be a plug 3 as substantially described herein. The engaging features are surfaces formed as a result of a depression having the shape of an inwardly converging receiving taper. This taper preferably comprises an upwardly inclining substantially upwardly facing bottom surface and a downwardly inclining substantially downwardly facing top surface. The receiving taper may converge to an intermediary position where the inclining surfaces both tend horizontally backward for a distance forming a closed ended slot suitable for accommodating an equivalent end protrusion or nipple portion of an alignment component 50 of the engaging connector 2.

The receptacle covers 12, 28 are formed from sheet metal or any another rigidly deformable sheet material. Each cover 12, 28 is bordered, about a first fold line, with a rear anchoring portion. The anchoring portion is sandwiched between the corresponding top or bottom wall of the back section of the housing 65 and a corresponding top or bottom retaining clip 122. The first fold line is preferably adjacent to the front edge of the retaining clip 122.

As shown in FIG. 5a, each cover 12, 28, in the closed position, comprises an initial portion of the sheet that is bent along the first fold line outwardly away from the optical component. This initial outwardly extending portion of the cover 12, 28 bends about the first fold line to be substantially adjacent to the front facing of the retaining clip 122. The cover 12, 28 then comprises a second fold line substantially parallel to the first fold line and substantially coincident with the outermost surface of the retaining clip 122. The cover 12, 28 is bent about this second fold line such that a substantially rectangular flat planar sheet extends forwardly in the direction of connector engagement 6 and inclining in a converging manner towards the other cover 12, 28.

In closed position, each cover 12, 28 converges towards the opposing cover 12, 28, to meet at opposing mouth edges 124. As shown in FIG. 5a, the receptacle covers 12, 28 in the closed position follow the gradient of the inclined portions of the top and bottom housing walls. The mouth edge 124 of each cover 12, 28 opens and closes as the covers 12, 28 open and close, thus creating an opening 26 (see FIG. 10d) through which another connector may protrude through. Preferably the other connector is a plug 3 connector and the opening 26 created by the movement of the receptacle cover mouth edges 124 to the respective open positions is sized to allow the plug front engaging component 48 and plug covers 12, 28 (at least in closed position) to enter the receptacle 5.

Each cover 12, 28 further comprises a forwardly terminating lip 30 extending from the mouth edge 124. The lip 30 is formed by folding back the forward terminal end of the cover 12, 28 about a fold line such that the fold line becomes the mouth edge 124 of that cover. In the closed position, each lip 30 inclines forward in the direction of connector engagement and outward away from the opposing mouth edge 124. The lips 30 act to aid the mechanical opening of the covers 12, 28 by providing two surfaces that converge towards the receptacle 5 and guide a front engaging component 48 of a complementary connector, such as a plug 3 connector, into the middle of the receptacle covers 12, 28 where the receptacle mouth edges 124 meet.

The covers 12, 28 in the closed position act to substantially obscure the optical path to and from the optical component.

The two shields 20, 38 as shown in FIGS. 5a, 5b and 5c are configured to each reside between the optical component 4 and the adjacent cover 12, 28. Each shield is formed from a strip of sheet metal however in principle any suitable resiliently deformable material may be used. Each shield is configured to be moveable from a closed to an open position by being urged outwardly as a portion of an external connector 3 is driven forwards into the receptacle 5 towards the receptacle optical component. Preferably the external connector is a plug 3 connector and the portion entering the receptacle 5 and urging the shields open is any of the plug front engaging component and/or the plug covers in closed position. Once the complementary engaging connector is removed from the receptacle 5 the receptacle shields (and receptacle covers) move back to their nominal closed positions.

Each shield 20, 38 comprises first and second fold lines, similar to the covers and is similarly bordered by an anchoring portion that is also securely sandwiched between the retaining clip securing the adjacent cover anchoring portion and the corresponding top or bottom wall of the housing back section.

Each shield 20, 38 further comprises a first shield portion 32 and a second shield portion 34. The first shield portion 32 borders the second shield portion 34 along a further fold line and the anchoring portion along another fold line, wherein each fold line runs along the width of the strip substantially perpendicular to the strip elongate length. The first shield portion 32, in closed position, inclines forwardly along a similar inclination to the inclination of the adjacent cover 12, 28 in closed position. The second shield portion 34 is folded back in an opposing inclination to the first shield portion 32 and lies in the path of optical communication. As shown in FIGS. 6d and 6e, as each shield 20, 38 is being urged from closed to open position; the first shield portion 32 raises outwardly by pivoting about its first and second fold lines adjacent to the anchoring portion; whilst the second shield portion 34 raises outwardly by pivoting about the fold line joining the first a second shield portions. In effect the first 32 and second 34 shield portions tend towards a substantially flattened folded position as they are pushed into open position.

Engagement

FIGS. 6a to 6f progressively show the engagement of a plug 3 and receptacle 5 as described herein. In this series of figures, the housing 64, 65 of the plug 3 and receptacle 5 are not shown.

FIGS. 10a to 10e show exploded perspective views of the connector coupling as described below and shown by FIGS. 6a-6h.

In principle, the following engagement can be achieved using various complementary connectors 2 as described herein.

Figure 6A:
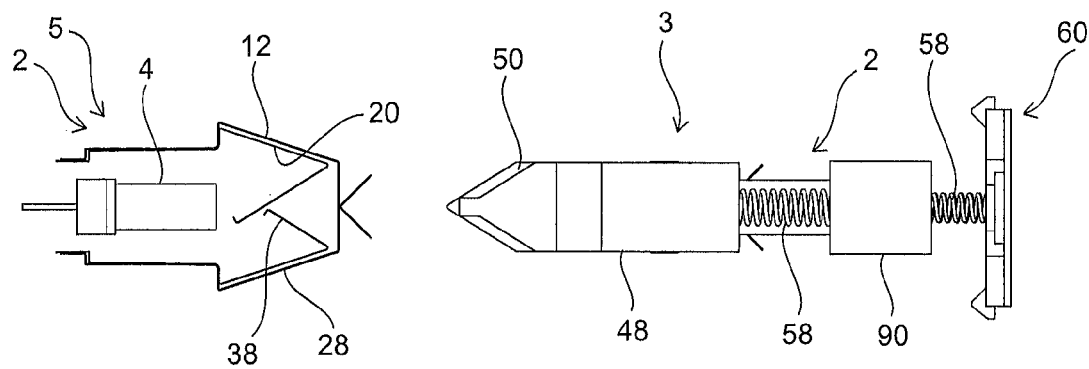
FIGS. 6a-6h show sequential views of the internal components of two complementary connectors engaging.
Figure 6B:
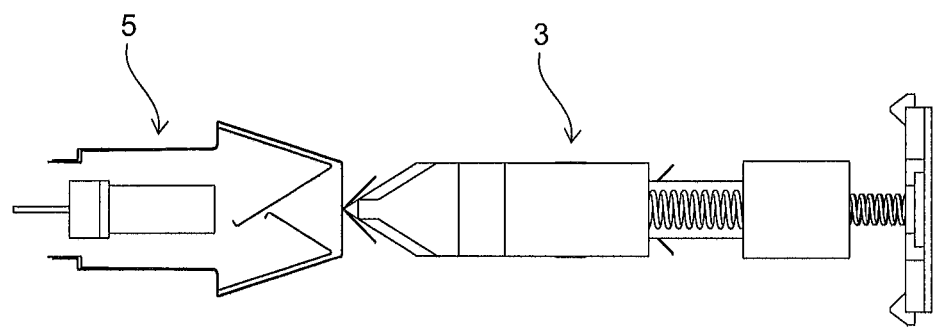

FIG. 6a shows the plug 3 and receptacle 5 separated whilst FIG. 6b shows the connectors 2 at the point of initial engagement where the front tip of the plug front engaging component 48 comes into contact with the forwardly terminating lips 30 of the covers 12, 28 of the receptacle 5.

Figure 6C:
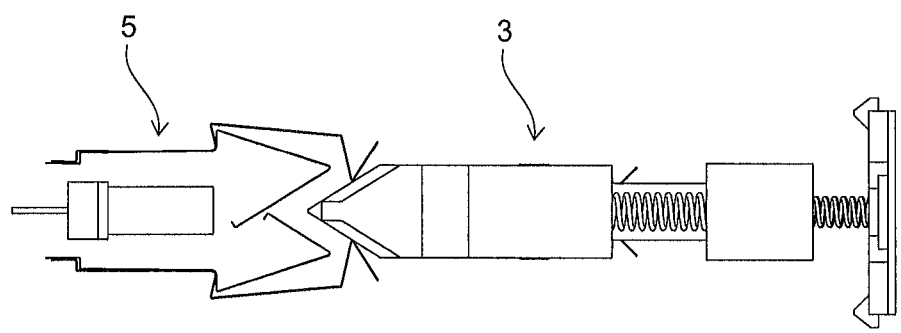
Figure 6D:
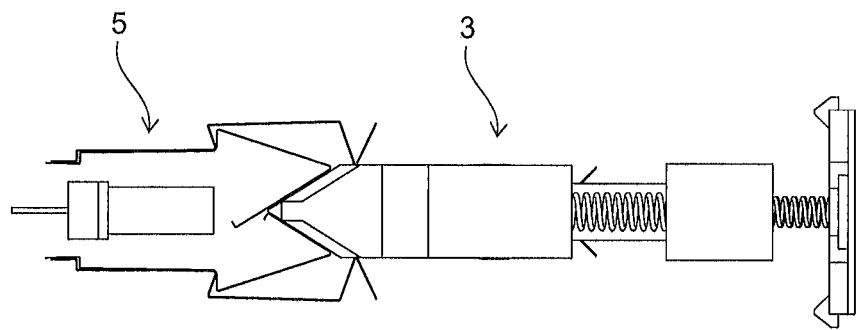
Figure 6E:
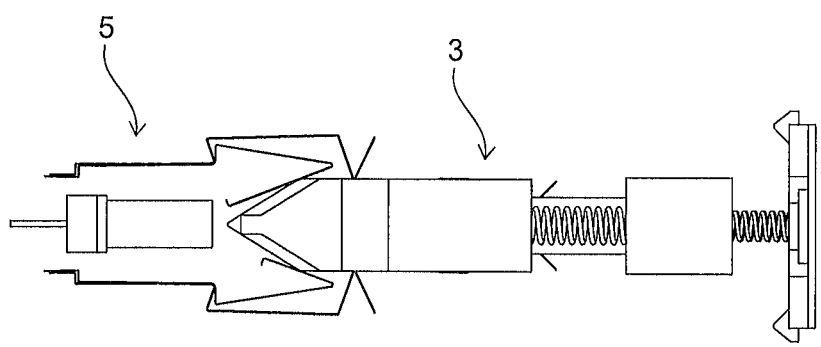

As the connectors 2 are then moved forwardly into coupling engagement, as shown in FIGS. 6c and 6d, the plug front engaging component 48 urges the receptacle covers 12, 28 into the second 'open' position whereby the plug front engaging component 48 and the plug covers 12, 28 are inserted into the opening 26 made by the opening of the receptacle covers. FIG. 6d shows the position where the plug front engaging component 48 has opened the receptacle covers 12, 28 and is in initial contact with the receptacle shields 20, 38.

The movement of the connectors 2, after FIG. 6d, continues towards each other (either by moving one or both of the connectors 2). The plug front engaging component 48 forces open the shields 20, 38 of the receptacle 5 and continues along the direction of connector engagement 6 until the alignment components 51 of the plug 3 (residing upon the plug front engaging component 48) contact and engage with the complementary 'receiving' alignment components 50 of the receptacle 5. In this example the alignment components 50, 51 are tapered surfaces.

FIG. 6e shows the situation where the connectors 2 have been moved so that the said complementary alignment components 50, 51 of the connectors 2 have made contact and cannot proceed further in the direction of connector engagement 6.

Figure 6F:
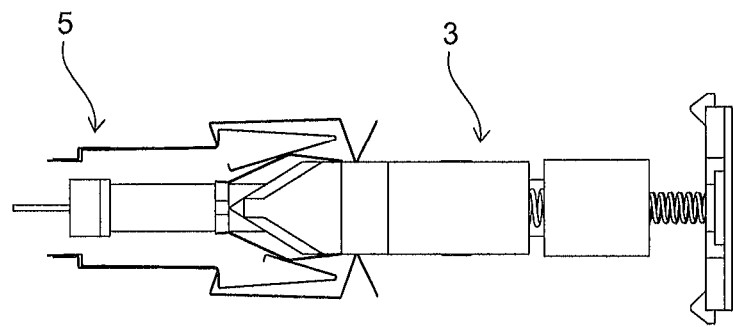
Figure 6G:
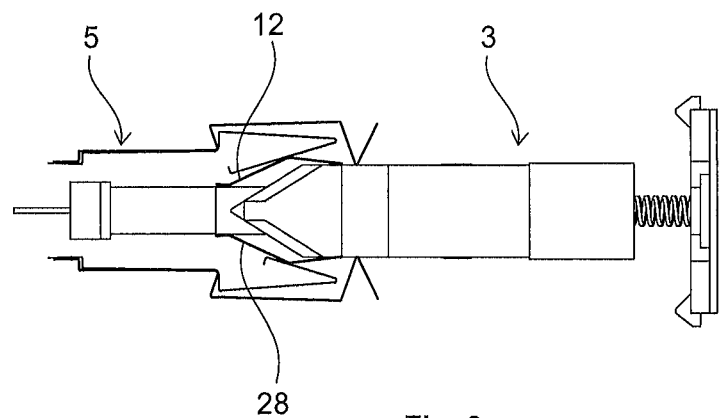
Figure 6H:
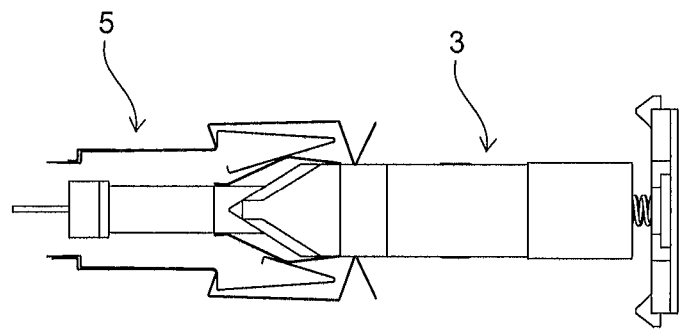
Figure 10E:
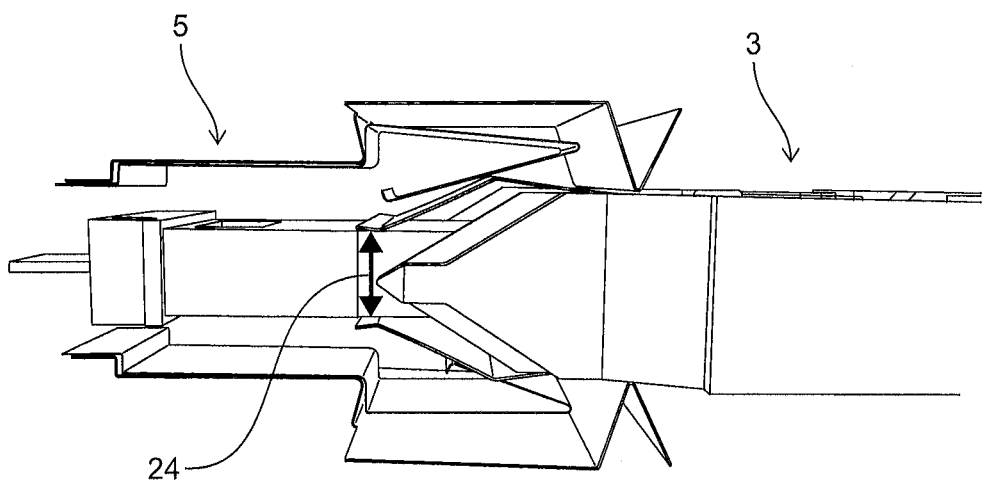

The external force driving the connectors 2 into engagement then further continues, in FIGS. 6f, 6g and 6h, to urge the plug front engaging component 48 backwardly into the plug 3. As this happens, the biasing components 58 between the plug optical mount 90 and plug front engaging component 48 compress, as shown in FIG. 6f. This, in combination with the stronger biasing components 58 between the plug back end component 60 and optical mount 90, forces the plug optical component 4 (mounted on the plug optical mount 90) to drive into the plug front engaging component 48. The plug optical component 4 is therefore caused to contact and push against the inner surfaces 18 of the plug covers 12, 28, as shown in FIG. 10d. This action urges the plug covers 12, 28 into an open position allowing the plug optical component 4 to protrude through the opening 24 created by the plug covers 12, 28 as shown in FIG. 10e. FIG. 11 shows a perspective view of the plug optical component 4 opening the plug covers 12, 28. This motion continues until the optical components 4 come into mating engagement (FIG. 6g) wherein the alignment pins of the optical ferrule housed by the plug 3 insert into complementary recesses in the optical ferrule housed by the receptacle 5.

Any further forward movement in the direction of connector engagement 6 is accommodated, to an extent, by the compression of the biasing components 58 coupled between the plug optical mount 90 and plug back end component 60 as shown in FIG. 6h.

PCB

FIGS. 7, 8a-8c and 9a-9d illustrate an example of a printed circuit board (PCB) suitable for supporting and optically coupling to an external optical assembly. The PCB 200 comprises a first outer support layer 204 and an optical layer 206. The optical layer 206 comprises a cladding material 210 and a first planar cladding surface 208 substantially parallel with and facing towards the first outer support layer 204. The cladding material 210 comprises a plurality of optical waveguides 212 bordering the first planar cladding surface 208, although in principle the cladding material 210 may comprise one or more waveguides 212. The optical layer 206 may also be referred to as an optical cladding layer. The PCB 200 in FIG. 7 further comprises a first recess 214 extending through the first outer support layer 204, optical layer 206, optical waveguides 212 and a second outer support layer 226. In principle, the first recess 214 may at least partially extend through the optical layer 206 and does not have to extend into the second outer support layer 226. The PCB 200 also further comprises a second recess 216 extending through the first outer support layer 204 and exposing a portion of the first planar cladding surface 208. The second recess 216 overlaps the first recess, although in principle PCB's 200 as presented herein may also comprise first 214 and second recesses 216 bordering each other or being separate to each other.

The first 214 and second 216 recesses are substantially rectangular in plan cross section comprising two opposing short sides 215 and two opposing long sides 217, but in principle may be any suitable shape. The second recess 216 overlaps the first recess 214 along one of the short sides 215 of the first recess 214 and is oriented perpendicular to the first recess 214 such that one of the long sides 217 of the second recess 216 is substantially parallel to one of the short sides 215 of the first recess 214. The first recess 214 overlaps the second recess 216 so that one of the short sides 215 of the first recess 214 lies within the plan cross section of the second recess 216 whilst the opposing first recess short side 215 lies outside of the second recess 216. The said long side 217 of the second recess 216 is longer than the said short side 215 of the first recess 214 such that the long side 217 of the second recess 216 extends proud at either end of the length of the first recess short side 215 in the region of overlap. This creates a substantially U-shaped exposed portion of the first planar cladding surface. In another equivalent interpretation of this example, the second recess 216 could simply be the said resulting U-shape, thus the first 214 and second recesses 216 are adjacently bordering each other along the inner surface of the U-shape.

The said recesses may be formed by any suitable technique, for example creating the first recess 214 by milling, other machining methods or any other suitable method of creating a substantially rectangular hole into or through the PCB 200. The second recess 216 may be formed after the first recess 214 by selectively removing the first outer support layer 204.

Figure 7:
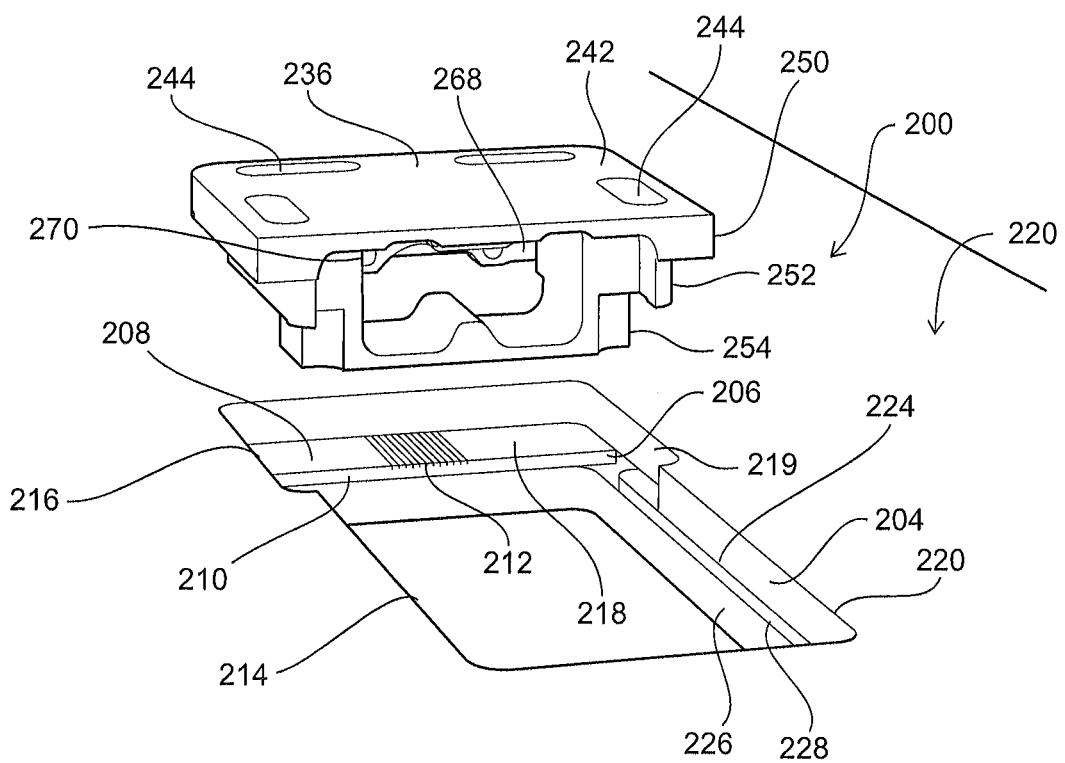
FIG. 7 shows a PCB and a sub-mount.
Figure 7B:
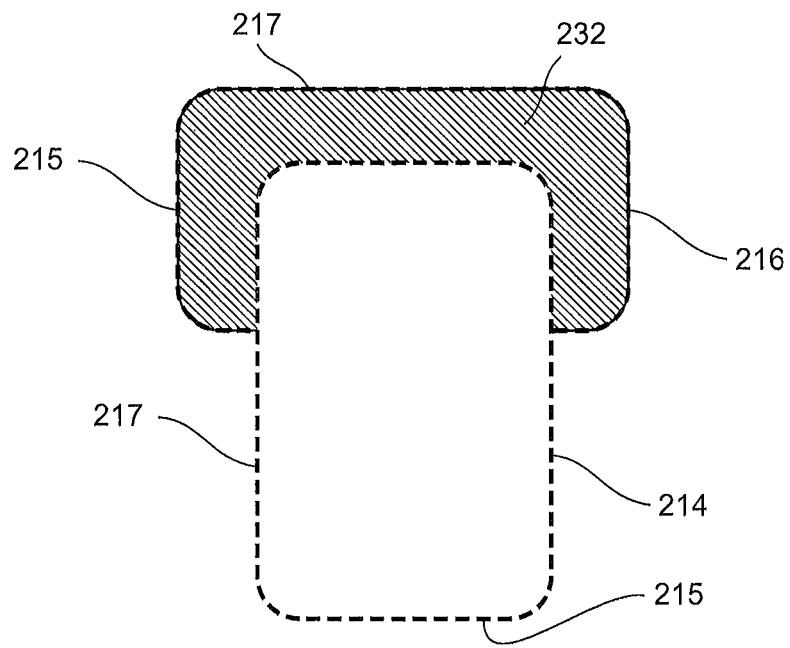
FIG. 7b shows a schematic plan view of two overlapping recesses of the PCB.

FIG. 7 shows an example of a PCB 200 comprising a single first recess 214, a single second recess 216, a single first outer support layer 204, a plurality of waveguides 212 in an optical layer 206 and a second outer support layer 226. The first outer support layer 204 in FIG. 7 comprises an outer planar surface 220. Typically this is one of the outermost surfaces of the PCB 200. The first outer support layer 204 further comprises an inner planar surface 224 bordering the first planar cladding surface 208. The second outer support layer 226 comprises an inner planar surface bordering and facing the optical layer 206 and facing the first outer support layer 204. The first and second outer support layers sandwich the optical layer 206.

In principle however the PCB 200 may be varied and modified as described herein and may comprise more than one set of first and second recesses 214, 216 located in different positions on the PCB 200.

The PCB waveguides 212 (which may in principle comprise one or more optical waveguides 212) are arranged in a waveguide array wherein the waveguides 212 in the array are uniformly spaced apart along a direction parallel (i.e. horizontally) to the major plane of the PCB 200. In principle the PCB 200 may comprise more than one waveguide array. The PCB 200 may comprise a plurality of waveguide arrays vertically spaced (i.e. in a direction perpendicular to the major plane of the PCB 200) wherein each array is preferably spaced apart from another array within the optical layer 206. FIG. 7 shows a PCB 200 with a single waveguide array.

As shown in FIG. 7, the optical waveguides 212 extend substantially longitudinally in the plane of the optical layer 206. Each waveguide 212 extends into the optical layer 206 from the first planar cladding surface 208 such that at least a portion of the cross sectional periphery of the waveguide 212 is coincident with the first planar cladding surface 208.

The waveguides 212 are preferably formed from either a glass material or a polymer material. Preferably the cladding material 210 of the optical layer 206 comprises a similar material to the waveguides 212 but comprises a lower refractive index than the waveguides 212 at the desired wavelength of operation.

The waveguides 212 in the printed circuit board of FIG. 7 are graded index (GRIN) waveguides 212 formed within the cladding material 210 using any suitable technique, such as ion implantation. An example of a suitable technique for forming waveguides is that described in "Glass Panel Processing for Electrical and Optical Packaging," H. Schröder, L. Brusberg, et al., Proc. of 61st Electronic Components and Technology Conference (ECTC), Orlando, Fla., USA, 31 May-3 Jun. 2011, 625-633, the contents of which are incorporated herein by reference. The GRIN waveguides 212 are formed such that the top of the GRIN waveguides 212 are coincident with the first planar cladding surface 208.

FIG. 7 shows the second recess 216 bordering/overlapping the first recess 214 in the plane of the PCB 200. This composite recess has an exposed portion 218 of the first planar cladding surface 208 that provides a reference surface 222 for alignment of the optical waveguide 212 and external optical assembly. The reference surface 222 is used to align the optical waveguides 212 to an external optical assembly in a direction perpendicular to the plane of the PCB 200. The first recess 214 in FIG. 7 extends all the way through the PCB 200 (substantially perpendicular to the plane of the PCB 200) and comprises a side wall extending through the cross section of the waveguides 212 creating a plurality of waveguide coupling facets. The sidewall in FIG. 7 is also perpendicular to the propagation direction of the waveguides 212 at the facet, thus creating flat facets. However in principle, the sidewall may be created to extend through the waveguides 212 creating angled facets to reduce the effects of facet back reflections.

The second recess 216 extends through the outer support layer 204 stopping at the first planar cladding surface 208. At least a portion of the second recess 216 in FIG. 7 does not overlap the first recess 214 so that the composite recess formed from the overlapping/bordering of the first 214 and second recess 216 creates a U-shaped ledge portion 232. In principle however any ledge may be formed. The ledge portion 232 extends along a border between the first and second recesses and comprises the portion of the first recess sidewall that extends through the optical waveguides 212. The U-shaped exposed portion provides a stable platform for an optical sub-mount 236 because it has one front surface (corresponding to the flat bottom of the U) and two perpendicularly extending opposing side surfaces for the optical sub-mount 236 to rest upon.

The first recess 214 in FIG. 7 is configured to accommodate at least part of an external optical assembly. The second recess 216 in FIG. 7 is also configured to accommodate a part of the same external assembly.

Sub-Mount

FIG. 7 further shows an optical sub-mount 236 suitable for contacting a PCB 200 as described herein or any other suitable PCB comprising one or more PCB recesses wherein the said one or more PCB recesses comprising a sidewall extending into a PCB outer layer. The sub mount 236 is configured to support an optical component 4 used for optically coupling to the PCB optical waveguides 212. In principle, the sub-mount optical component may couple to any optical component 4 (not shown in FIG. 7) supported by the PCB 200. The sub-mount 236 comprises a first surface 238, second surface 240 (shown in FIG. 8b) and third surface 242 (shown in FIG. 7) wherein the second surface 240 is angled in a perpendicular plane to the plane of the first surface 238. The first surface 238 is defined on the under surface of a U-shape flange formed by the first body section 250 of the sub-mount 236. When the sub-mount 236 is mounted onto the PCB 200, the first surface 238 faces the outer planar surface 220 of the first outer support layer 204 of the PCB 200 whilst the second surface 240 faces a sidewall 219 of the PCB second recess 216.

In principle however, each of the first 238 and second 240 surfaces are configured to at least partially face at least one surface, or recess surface, of the PCB 200 when the sub-mount 236 contacts the PCB 200. Preferably, at least one of the said PCB surfaces comprises the PCB recess sidewall.

The third surface 242 of the sub-mount 236 is a flat top surface that is substantially parallel with the PCB outer planar surface 220 when the sub-mount 236 is mounted onto the PCB 200.

The sub mount 236 also comprises a through-hole 244 extending from the third surface 242 through to the first 238 and second surfaces 240.

The recess sidewall that is used, in this example of FIG. 7, to bond with the sub-mount 236 is a sidewall of the second recess 216, however in principle the PCB recess sidewall may be another recess sidewall such, as the a sidewall of a first recess 214. As shown in FIG. 8, when the sub mount 236 contacts the PCB 200; the second surface 240 is configured to extend into the PCB recess when the sub mount 236 contacts the PCB 200.

The sub mount through-hole 244 therefore comprises an exit aperture that coincides with different surfaces of the sub-mount 236. An adhesive that is introduced through the through hole 244 from the third surface 242 and exits the through hole 244 via the first and second surfaces 238, 240 may therefore contact and bond different surfaces of the PCB 200 to provide a more secure, multifaceted bond between the PCB 200 and the sub-mount 236.

Figure 8A:
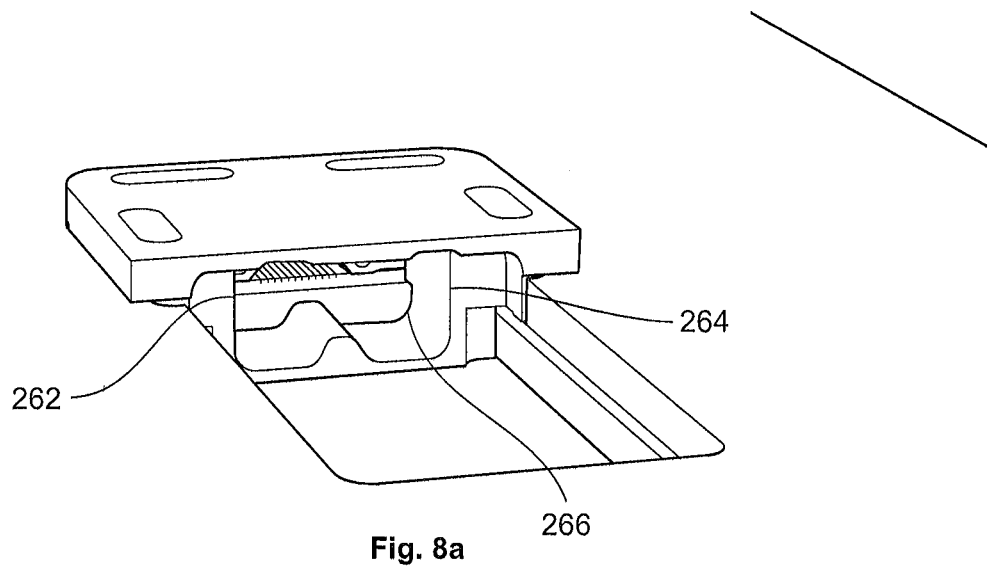
FIGS. 8a-8c show different views of the sub-mount contacting the PCB of FIG. 7, to form an integrated assembly.
Figure 8B:
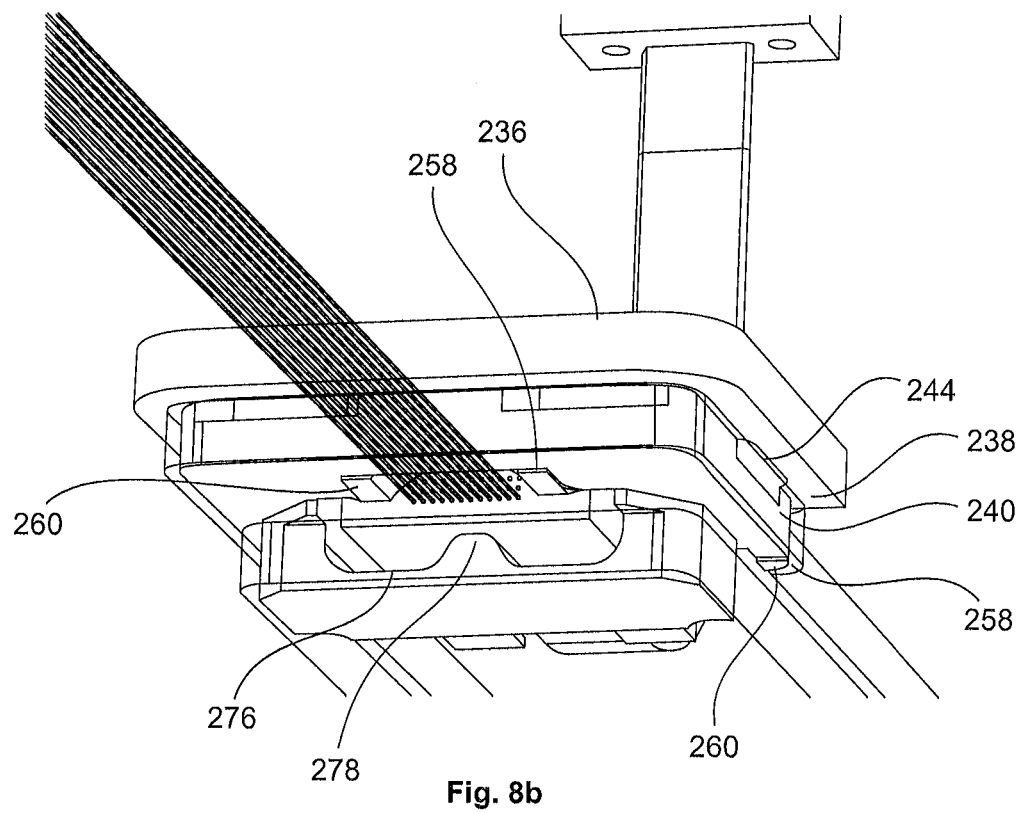
Figure 8C:
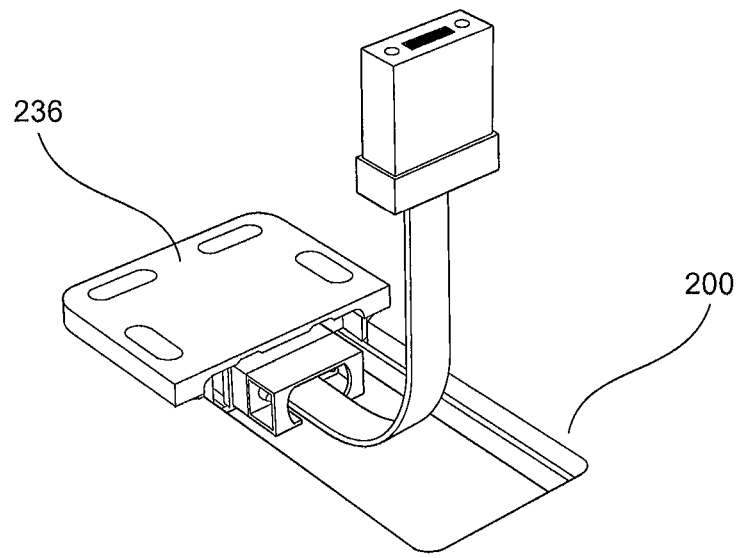

FIG. 8a shows a perspective view of the sub mount 236 of FIG. 8 accommodated in a composite recess of a PCB 200 as described above. FIG. 8c shows the same configuration as that of FIG. 8a further with the sub-mount 236 holding an optical component 4. In this example, the optical component 4 comprises an optical fibre ferrule. FIG. 8b shows the same arrangement of FIG. 8c but from the underside of the PCB 200.

In FIGS. 7 and 8a-8c, the through hole 244 exits through a common exit aperture on the first and second surfaces 238, 240 thus forming an adhesive fixing area. The through hole 244 is sized to allow an adhesive material to flow through an aperture in the third surface 242 and out of a common exit aperture on the first and second surfaces 238, 240. The first surface 238 and second surface 240 border, and are oriented perpendicular in plane to, each other. The first surface 238 resides on an underside of a first body section 250 of the sub mount that, when integrated with the PCB 200, resides proud of the PCB outer layer. The second surface 240 resides on a sidewall of a second body section 252 of the sub-mount 236 that, when integrated with the PCB 200, is configured to extend into the PCB recess. The second surface 240 resides on a sidewall of the second body section 252 that runs substantially perpendicular to the plane of the PCB 200. The through-hole 244 exit aperture goes through part of the border between the first and second surfaces 238, 240.

The through-hole 244 in this example therefore exits through sub-mount surfaces that face the recess wall of the second recess 216, and a portion of the outer facing PCB surface that borders the said recess wall. The PCB 200 surfaces that the sub-mount 236 bond to therefore form part of an outer recess ledge. The optical sub-mount 236 preferably comprises a plurality of such through holes 244 located around the sub-mount 236. The through holes 244 preferably comprise a cross section that is longer in one dimension than the other and oriented such that when mounted upon the PCB 200, the long length of the through-holes 244 run parallel with the length of the recess edge that the adhesive (of the said hole) intends to bond with. The through-holes 244 preferably have straight long edges and curved end edges to help facilitate flow of adhesive through the hole 244.

Four such through holes 244 are preferably provided, one each configured to align along the opposing outer sides of the U-shape exposed portion of the PCB, the other two sequentially aligned along the bottom outer side of the U-shaped exposed portion as shown in FIG. 7.

The optical sub-mount 236 in this example comprises a plurality of contact surfaces 260 configured to contact a complementary contact surface of the PCB 200. Preferably the sub-mount 236 comprises four such surfaces as shown in FIG. 8b. In principle a sub-mount 236 may comprise one or more of such surfaces. The sub-mount contact surfaces 260 are substantially parallel to the plane of the PCB 200 when the sub-mount 236 contacts the PCB 200 and form part of flat bottomed protrusions 258 extending outwardly from a bottom surface of the second body section 252 that faces directly away from the first body section 250 of the sub-mount 236. These sub-mount contact surfaces 260 are intended to contact complementary PCB contact surface areas residing on one or more exposed portions 218 of the PCB first planar cladding surface 208 (i.e. a bottom surface of the PCB second recess 216).

The optical sub-mount 236 of FIGS. 7 and 8a-8c comprises a third body section 254 extending into the first recess 214 of the PCB 200 in a direction substantially parallel to the facing direction of the sub-mount 236 contact surface 260. A sub-mount recess 262 is formed within the first, second and third body sections 250, 252, 254 of the sub mount 236. The sub-mount recess 262 comprises a first outer aperture 264 sized to accommodate the sub-mount optical component 4. In principle however the sub-mount recess 262 maybe formed in any one or more of these sections. The sub-mount recess 262 extends from the first outer aperture 264 into the sub-mount 236 substantially parallel to the plane of the PCB 200. The sub-mount recess 262 further comprises a second outer aperture 266 at the opposite end of the sub-mount recess 262. The second outer aperture 266 is configured and sized to allow an optical component 4 (such as an optical fibre ferrule in FIG. 8a-8c) residing in the sub-mount recess 262 to optically communicate with the waveguides 212 supported by the PCB 200. The second outer aperture 266 is also sized to prevent the said optical component 4 from passing through the second outer aperture 266. A first sub mount lateral contact surface 268, opposite to the first outer aperture 264, resides substantially adjacent to the second outer aperture 266 and is configured to be able to contact the sub mount optical component 4 when the optical component 4 is accommodated within the sub-mount recess 262. The first lateral contact surface 268 preferably extends substantially perpendicular to the major plane of the first sub mount body section. The first lateral contact surface 268 also preferably comprises two sub-mount alignment recesses 270 configured to accommodate two complementary alignment pins extending from an optical ferrule.

The third body section 254 of the sub-mount may in principle also comprise one or more second lateral contact surfaces configured to contact a sidewall of the first PCB recess when the sub mount contacts the PCB 200.

The sub mount recess 262 further comprises a sidewall 276 substantially perpendicular to the first outer aperture 264 and parallel with the third surface of the sub-mount. The sidewall 276 comprises a raised portion 278 for contacting the optical component 4. The raised portion 278 comprises a substantially flat surface parallel to the sub-mount recess sidewall 276. The raised portion 278 is located substantially in the middle of the cross sectional width of the recess sidewall 276 and runs longitudinally along the sub-mount recess 262 from the first outer aperture 264 to the second outer aperture 266. In principle however any raised portion of the said sub-mount recess 262 may be used to vertically align the sub-mount optical component within the sub-mount recess 262. Alternatively, the said sub-mount recess sidewall 276 may not comprise any raised portions, wherein the said optical component may directly contact and align directly from the sidewall 276.

The PCB 200 and optical sub-mount 236 may be combined to form an integrated assembly wherein the 'external optical assembly' as described by the description of the PCB 200, comprises the optical sub-mount 236 as described herein and optionally the sub-mount optical component 4. The integrated assembly may further comprise an adhesive material contacting the PCB recess sidewall, the PCB outer surface, the first body section 250, the second body section 252 and optionally the sub-mount recess 262. The integrated assembly may further comprise a sub-mount optical component 4 as shown in FIG. 9c.

Figure 9A:
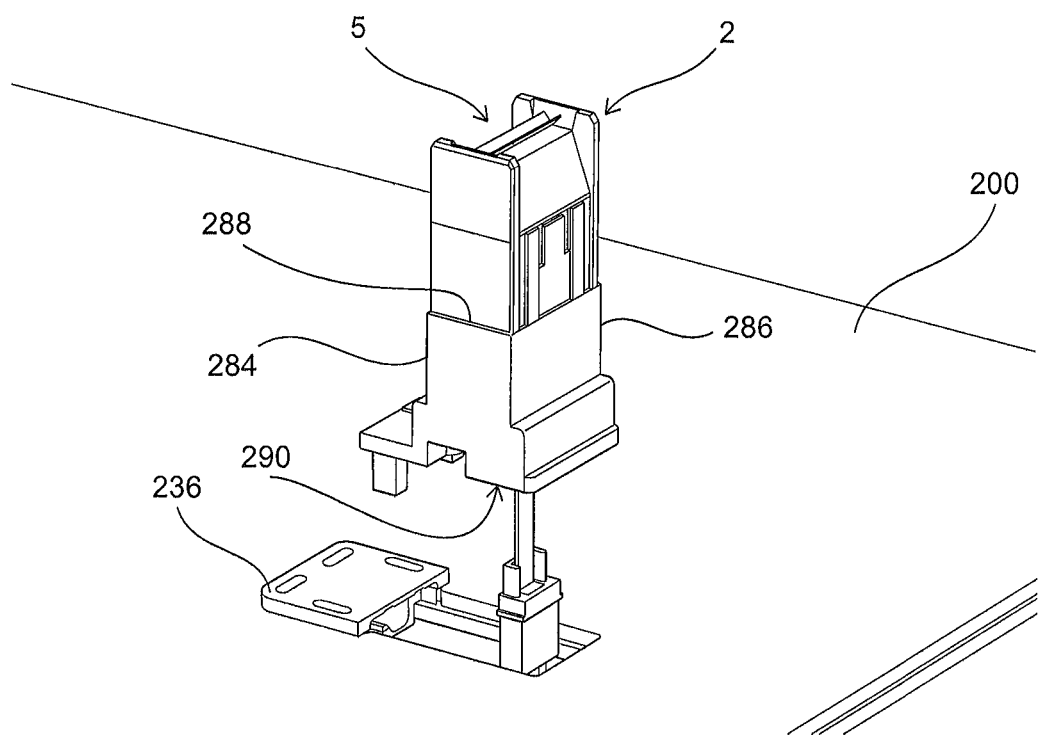
Figure 9B:
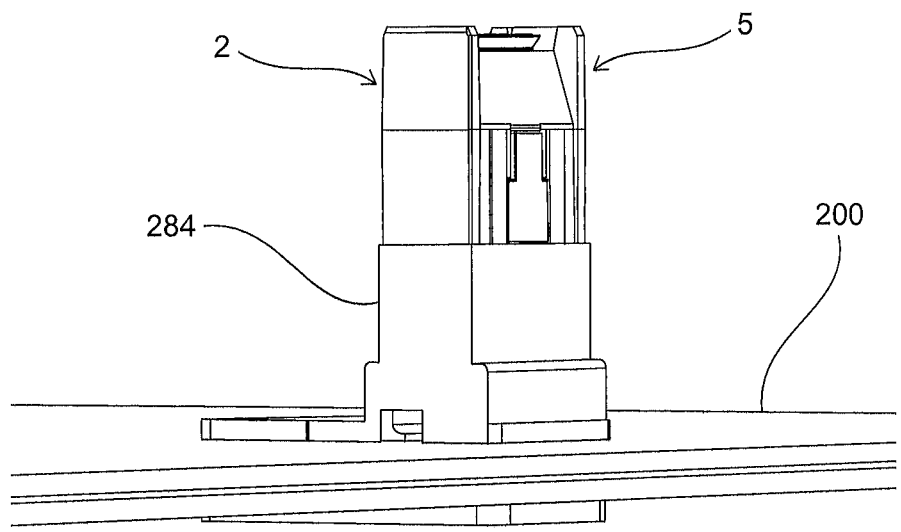
Figure 9C:
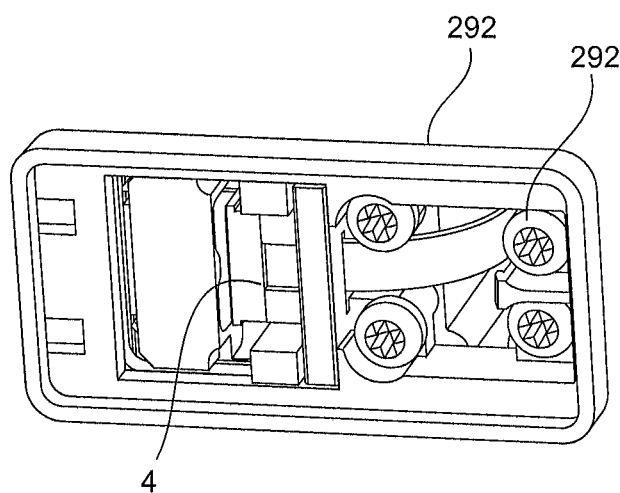
Figure 9D:
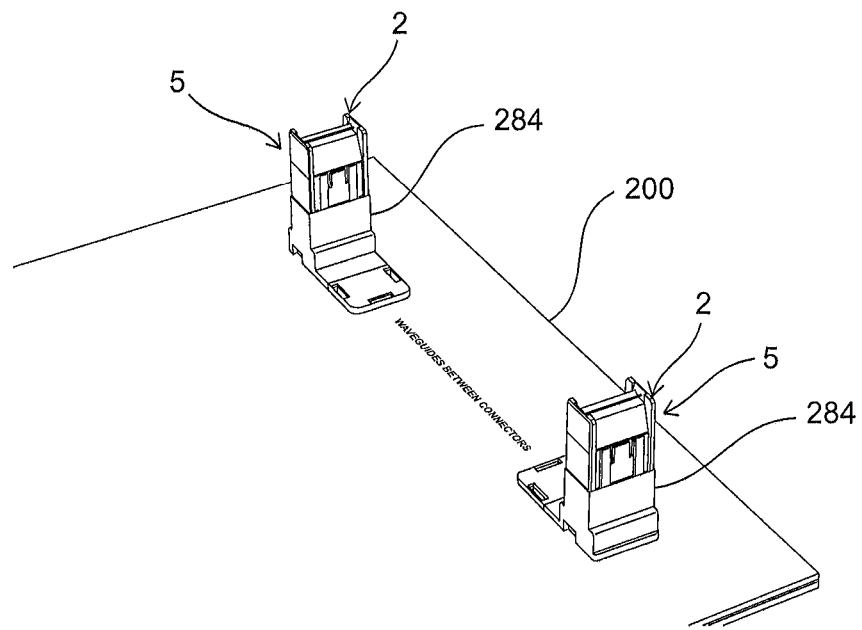

FIGS. 9a-9c show the PCB 200 of FIGS. 7, 8a-8c, integrated with the sub-mount 236 of FIGS. 8a-8c wherein the first PCB recess is extended in plan cross section so that a portion of the first recess 214 can be used to locate at least partially underneath a socket 284. FIG. 9d shows two such integrated assemblies on the same PCB 200 optically coupled using PCB waveguides 212.

The socket 284 is disposed upon the PCB outer planar surface 220 and at least partially covers a portion of the first PCB recess 214. The socket 284 comprises an elongated housing (286) extending substantially perpendicularly away from the PCB outer planar surface 220 and comprising a first aperture 288 sized to accommodate an optical connector 2 and an opposing second aperture 290 residing substantially coincident with the PCB outer planar layer and sized to allow a further optical component to enter the socket 284 through the PCB first recess 214. The apertures 288, 290 are substantially rectangular in cross section, the first aperture 288 being sized to flushly fit the connector. The optical connector 2 shown in the example of FIGS. 9a-9c is a receptacle 5 connector substantially as described herein, wherein the receptacle 5 houses the further optical component, which in this example is an optical ferrule. In principle the connector 2 engaged with the socket 284 may be any connector 2 described herein and the socket apertures 288, 290 may be of any cross sectional shape or size suitable to accommodate a connector 2.

The integrated assembly may further be configured such that the further optical component is in optical communication with the optical component 4 of the sub-mount 236. In the example shown in FIGS. 9a-9c, the further optical component is an optical ferrule accommodated in the receptacle 5 and optically communicating with the sub mount optical component 4 via an array of optical fibres.

The assembly further comprises attachment means 292 disposed on the opposing side of the PCB 200 to the PCB outer support layer 204. The attachment means 292 are configured to secure the socket 284 to the PCB 200 and may comprise screws, clips.

Further to the above examples, the connectors and their associated components and features as presented may be further modified as follows.

Covers

Connectors 2 described herein, (as exemplified by a plug 3 and a receptacle 5), preferably comprise one or more covers 12, 28.

The, or each of the covers 12, 28 may be configured to be able to move to and from a first position (referred to throughout also as a 'closed' position). The first position is typically configured to provide protection to a coupling facet of the optical component 4 (housed by the connector 2) from dust or any other unwanted material locating upon or around the facet (which commonly coincides with the end of the optical fibres though which light is output or input). The cover 12, 28 is further configured to be able to move to and from a second position (referred to throughout also an 'open' position). The second position is a different position/and or orientation of the cover 12, 28 about the connector 2 than the first position. The cover 12, 28 may have various intermediary positions in-between the first and second position and also may have further positions that are not in between the first and second position, however typically the first and second positions are 'end' positions. End positions are positions where the cover 12, 28 does not substantially move any further in the same direction or manner it took to get to that position. The retraction of the cover 12, 28 to an open position may be facilitated by a variety of input stimuli including any of: being mechanically forced open by a component forming part of the same connector 2; being mechanically forced open by a component external to the connector 2 (such as an engaging component of a complementary connector 2); being opened manually by a user; or any other suitable method or means to open the cover 12, 28.

The cover 12, 28 may be required to move from a closed to an open position to allow for optical communication with the optical component 4 and/or to allow for physical engagement between the connector 2 and another connector 2 and/or a component of another connector 2.

The cover 12, 28 may be formed of any suitable material and comprises one or more outer surfaces that, when at least in a closed position, act to shield the optical component 4 from dust or other unwanted material. Preferably the cover 12, 28 comprises a sheet material. Preferably the cover 12, 28 material is resiliently deformable and/or can be resiliently biased in one position about a fold line. Preferably the cover 12, 28 comprises a sheet metal.

Preferably, the cover 12, 28 comprises an outer surface 14 as shown in FIG. 4a (exemplified by a receptacle connector). Preferably the cover 12, 28 is configured in the first position; to reside at least partially in-front of the optical component 4 along a direction parallel to the direction of connector engagement 6 (see FIG. 1d); and, to provide at least a component of the outer surface normal 16 (see FIG. 5a) that is parallel to the direction of connector engagement 6. In other words, the outer surface 14 of the cover in closed position is viewable when looking at the connector 2 along the axis of connection 8. Preferably, as the cover 12, 28 moves between the first position to the second position, the said outer surface 14 of the cover 12, 28 continually faces away from the optical component 4. By having the outer surface 14 continually facing away from the optical component 4 as the cover 12, 28 moves from a closed to an open position, any dust that has accumulated upon the outer surface 14 will not fall directly upon the optical component 4 as the cover 12, 28 moves. Preferably the first position of the cover 12, 28 provides the outer surface 14 at least partially facing towards the direction of connector engagement 6; and the inner surface 18 at least partially facing the first optical component 4 accommodated by the connector 2.

The components of the optical connector 2 may be formed of any suitable materials to provide the functions required. For example, the housing 64, 65, front engaging component 48, alignment components 50, 51 and other components as described herein; such as those supporting the cover 12, 28 or the optical component 4 may be formed of one or more rigid materials such as, but not limited to, plastics and may be injection moulded.

The said cover 12, 28 in the closed position may at least partially incline towards the optical communication path 10 so that the outer surface 14 of the inclined portion blocks the movement of unwanted material towards the optical component 4 along the optical communication path 10. Preferably the cover 12, 28 inclines forwardly.

The cover 12, 28 may form part of a component that also includes one or more further portions that act to anchor or attach the cover 12, 28 to the connector 2 or to another component housed about or within the connector 2. The cover 12, 28 may move from the closed to open position about a pivot in between the anchoring portion and the cover 12, 28. Such a pivot may be a fold line along a sheet, a hinge, or any other suitable pivot.

The anchoring portion may comprise features operative to secure at least the anchoring portion in a fixed position about the connector 2, for example, any of: lugs, flanges, protrusions that fit into corresponding recesses or cavities in other connector components, screws fittings, or any other suitable fastening means.

The anchoring portion may further comprise cut outs or slots that fit or snap fit onto features of another connector component. For example, the component (for example the top wall of a front engaging component 48 of a plug 3) anchoring the anchoring portion may comprise an upstanding button, under which a slot of the anchoring portion may engage. The component anchoring the anchoring portion may further comprise a shallow depression shaped to accommodate and fit flush with the anchoring portion such that when the anchoring portion resides in the shallow depression it is prevented from moving laterally. If the component anchoring the anchoring portion also comprises a button or other vertically securing feature, the anchoring portion and hence cover 12, 28, is fully secured in all degrees of freedom so that the cover 12, 28 can only move between its open, closed or possibly other intermediate or further position as described herein.

The cover 12, 28 and/or anchoring portion may also be secured onto other components of the connector 2 using any other suitable external anchoring means such as one or more retaining clips 122.

The connector 2 may comprise a plurality of covers wherein each cover 12, 28 is configured to move from a respective closed position to an open position so that the combined opening action 22 of the covers causes the expansion of an opening 24, 26 through which the optical component 4 can communicate and/or receive external components such a portion of a complementary connector 2 and/or an optical component 4 housed by the complementary connector 2. The opening 24, 26 may also be sized to accommodate a further component on the same connector 2. The covers may have mouth portions 124 which converge upon closing to substantially close the opening 24, 26.

The mouth portions 124 may comprise one or more edges that form at least part of the perimeter of the opening 24, 26 and act to close the opening 24, 26 when the edge from one cover 12, 28 converges with the edge of another cover 12, 28.

The edge may be a protruding flange ending with the edge, or formed by an outermost apex of a folded end portion of the cover 12, 28.

Preferably, the connector 2 comprises two covers 12, 28 each configured to move from a closed position to an open position. Preferably the two covers 12, 28 are configured to open away from each other in substantially opposing motions. These opposing motions may include moving at least partially in opposing directions from each other, to create an opening 24, 26 through which the optical component 4 of the connector 2 may optically communicate. Preferably the covers 12, 28 open substantially outwardly and perpendicularly from the axis of connector engagement 8 and/or the optical communication path 10 of the connector 2.

As the covers 12, 28 move from an open position to the closed position, one or more mouth portions of one cover 12, 28 may tend toward one or more mouth portions of the other cover 12, 28 such that the opening (24, 26) becomes increasingly smaller until both covers reside in the closed position where the said portions or part of each cover 12, 28 may meet to close the opening (24, 26) or substantially come into close proximity to each other. The closed position may be the position at which the mouth portions of the opposing covers 12, 28 are in closest proximity to each other.

Any cover 12, 28 may be formed from one or more materials that are resiliently biased against the opening (24, 26) motion, such that an external force is required to open the cover 12, 28 from a nominal closed position and when the force is removed, the cover 12, 28 reverts back to the closed position. The cover 12, 28 may be formed of a sheet material such as a metal.

Any cover 12, 28 may comprise one or more lips 30 on the forwardly terminating portion of the cover 12, 28. Such lips 30 are operative to allow an external device moving towards the connector 2 against the connector's direction of connector coupling, to physically contact and push against the lips 30 causing the cover 12, 28 to open. The lips 30 are preferably disposed upon or adjacent to the mouth portion of the cover 12, 28 and inclined forwardly towards the direction of connector coupling such that when the external component contacts and pushes upon the opening lips 30, the inclination of the lips 30 and the forward force of the external pushing component cause the lips 30 to raise towards the open position as the external component moves forward into or towards the connector 2. Preferably the lips 30 are formed from a back-folded portion of the cover 12, 28 where the outermost apex of the fold forms the mouth edge. The connector 2 may comprise two covers 12, 28, each with a lip that folds outwardly away from the other lip so that an external component inserted in between the lips 30 forces each cover 12, 28 open.

Alternatively or additionally, the cover 12, 28 may be caused to raise to the open position by another component from behind the cover 12, 28 that is moving outwardly from the connector 2 in the direction of connector engagement 6. As the component moves outwardly from the connector 2 it contacts an inside surface 18 of the cover 12, 28, urging the cover 12, 28 towards the open position. Preferably, for this method of cover 12, 28 opening, the cover 12, 28 comprises a portion either comprising an inclination towards the direction of connector engagement 6 or perpendicular to such a direction such that the pushing component is provided with an inner surface 18 to contact and push against.

Shield

The connector 2 may have one or more shields 20, 38 moveable between a respective first position and a second position, whereby at least one shield 20 in its first position, is configured to be disposed in the path of optical communication 10. The first position may be a closed position whilst the second position may be an open position. The shield 20, 38 may be moved from and to other positions.

The shield 20, 38, in its first position, may be configured to be disposed between the optical component 4 and a cover 12, 28 when the cover 12, 28 is in the first position. The shield 20, 38 may be configured to be mechanically urged from its first position towards its second position as the optical connector 2 and complementary connector 2 are urged into coupling engagement. The shield 20, 38 may be configured to move from its first position towards its second position after a cover 12, 28 moves from its first position towards its second position, as the optical connector 2 and complementary connector 2 are urged into coupling engagement.

The shield 20, 38 may comprise a first shield portion 32 comprising an outer shield surface 36. The first shield portion 32 may be configured in the first position: to reside at least partially in-front of the first optical component 4 along a direction parallel to the direction of connector engagement 6, and to provide at least a component of the outer shield surface normal 16 that is parallel to the direction of connector engagement 6. The shield 20, 38 may comprise a second shield portion 34 configured in the first position to be disposed in the path of optical communication 10. The second shield portion 34 may be folded back from the first shield portion 32. The second shield portion 34 may be folded back substantially towards the first optical component 4. The second shield portion 34 may therefore be simply pushed outwardly as an external component enters the connector 2 and moves toward the optical component 4.

A connector 2 may further comprise a second shield 38 configured to move from a respective first position to a second position, whereby the second shield 38, in its first position, may be configured to contact and support the second shield portion 34 of the first shield 20 in its first position. The second shield 38 may have a first shield portion 32 and second shield portion 34 similar to that of the first shield 20 whereby the second shield portion 34 is folded back from the first shield portion 32. The terminal end of the second shield portion 34 of the second shield 38 may be configured in the second shield's first position to contact or substantially reside proximal to an outer facing surface of the second portion of the first shield 20.

Any shield 20, 38 may be formed from one or more materials that are resiliently biased against the opening motion, such that an external force is required to open the shield 20, 38 from a nominal closed position and when the forced is removed, the shield 20, 38 reverts back to the closed position. The shield 20, 38 may be formed of a sheet material such as a metal.

Any shield 20, 38 may form part of a component that also includes one or more further portions that act to anchor or attach the shield 20, 38 to the connector 2 or to another component housed about or within the connector 2. The shield 20, 38 may move from the closed to open position about a pivot in between the anchoring portion and the cover 12, 28. Such a pivot may be a fold line along a sheet, a hinge, or any other suitable pivot.

The shield anchoring portion may comprise features operative to secure at least the anchoring portion in a fixed position about the connector 2, for example, any of: lugs, flanges, protrusions that fit into any corresponding recesses or cavities in other connector components, screws fittings, or any other suitable fastening means. Any suitable means used to attach the anchoring portion of one or more covers as described herein may also be used equivalently to anchor one or more shields 20, 38. The shield 20, 38 and/or anchoring portion may also be secured onto other components of the connector 2 using any other suitable external anchoring means such as one or more retaining clips 122.

Housing

The connector 2 may have one or more housings 64, 65. The housing preferably accommodates at least an optical component 4. The housing 64, 65 preferably accommodates further connector components as described herein such as one or more covers 12, 28. The housing 64, 65 may reside adjacent to at least a portion of the optical component 4 and comprise at least one surface surrounding and being adjacent to a corresponding surface of the optical component 4. Preferably the housing 64, 65 comprises any one or more of: a side wall, a top wall, a bottom wall, a back wall. Preferably, the housing 64, 65 comprises a top wall, a bottom wall and two side walls. The housing 64, 65 preferably comprises a front opening through which the optical component 4 may optically communicate with an external optical component 4. The front opening may further be sized to accommodate at least a front portion of a complementary optical connector 2. The connector 2 may be configured such that at least a portion of the outer surface 14 of a connector cover 12, 28, when in a closed position, at least partially obscures this opening 26. Preferably the cover 12, 28 fully obscures the opening when in the closed position.

The housing 64, 65 may comprise a portion that overhangs the cover 12, 28 and/or optical component 4 and/or other components as described herein such as a front engaging component 48. Preferably the overhanging housing portion overhangs both the optical component 4 and the cover 12, 28 when in closed position. Preferably the overhanging portion is a lateral extension of the top, bottom and side walls of the housing 64, 65, ending in an opening (24, 26) though which the optical component 4 may optically communicate.

The housing 64, 65 may have one or more internal guide surfaces disposed upon one or more internal side walls of the housing 64, 65. These may form part of a funnelling alignment component 116 and/or receiving alignment component 50 of a receptacle 5. Any of the said internal guide surfaces may run longitudinally along the length of the housing 64, 65, for example running at least partially between the front to the back of the connector 2, which may be parallel with the direction of connector engagement 6. Any of the guide surfaces may face either substantially upwardly or downwardly such that the surfaces are horizontal in plane and face substantially perpendicularly from the direction of connector engagement 6. Any of the guide surfaces on a said internal side wall may be formed by a depression in the wall or from one or more inwardly extending protrusions extending inwardly into the connector 2 from the wall, that form one or more ledges. Preferably the guide surfaces are used to guide the horizontal movement of one or more internal components, such as a front engaging component 48 and/or an optical mount 90, along and directly away from the direction of connector engagement 6. The connector 2 may be configured such that the said internal components comprise one or more side portions (such as a side flange) that sit upon, or otherwise contact, at least one of the said guide surfaces allowing the said component to telescopically slide back and forth within the connector 2 along the axis of connector engagement 8. The housing 64, 65 may have at least one side wall comprising two guide surfaces oppositely facing one another, thus providing a top and bottom guide surface for an internal component wherein the portion of the internal component guided by the surfaces may contact at least one, preferably two, of the said guide surfaces, vertically confining the internal component within the connector 2. Preferably, the opposing side wall comprises a similar set of two opposing guide surfaces.

Any one or more internal side walls of the housing 64, 65 may further comprise one or more horizontal stopping surfaces formed from a depression or a protrusion as similarly discussed above for the guide surfaces. Any of the said surfaces may be configured to act as a physical stop or barrier that at least a portion of an internal component may come into contact with as it slides along the axis of optical connector engagement. Any of the stops may be formed from the same depression or protrusion used to form any of the guide surfaces on the same internal sidewall. Any of the sidewalls may comprise one or more stops configured to stop a component sliding forwardly in and/or backwardly from the direction of connector engagement 6.

Alignment Flanges

The housing 64, 65 of the plug 3 and/or the receptacle 5 (or any other connector 2 described herein) may further comprise one or more alignment flanges 70. An example of an alignment flange 70 is shown in FIGS. 1*a*-1*d*, 1*f* and 2*a*-2*b*. The alignment flanges 70 may protrude outwardly from an outer peripheral wall of the housing 64, 65. Preferably the said flanges protrude from one or more side walls of the housing 64, 65. Any of the said outer walls having one or more alignment flanges 70 may comprise a plurality of alignment flanges 70 arranged to accommodate and support one or more housing alignment springs 72. The alignment spring/s are resiliently biased and are configured together with the alignment flange/s to removably secure the housing 64, 65, hence connector 2, to a mounting platform or board such as a PCB 200. The alignment springs 72 may be formed integrally with or separately to the housing 64, 65. Preferably the alignment springs 72 are formed from one or more sheet materials such as sheet metal that may be cut and/or folded to create the desired features as described below.

The alignment flanges 70 may be arranged such that one or more flanges 70 on the same wall are spaced apart from one or more other flanges 70 along the height dimension of the wall, wherein the height is the dimension of the wall extending peripherally around the connector cross section, and extending substantially perpendicular to the direction of connector engagement 6. For example, the height dimension of a sidewall is the length of that sidewall that runs the shortest distance between the adjoining top and bottom walls of the housing 64, 65. Any alignment flange 70 may comprise at least one surface substantially facing an opposing surface on another spaced apart flange 70. The alignment spring 72 may be configured to reside between, and optionally removably secured to, at least one or more of each of the said opposing spaced apart alignment flanges 70. The space in between the opposing spaced apart flanges 70 is preferably sized to accommodate both the said alignment spring 72 and a portion of the mounting platform 200.

The opposing alignment flanges 70 on the same wall may comprise a plurality of alignment flanges 70 spaced apart from a further plurality of alignment flanges 70 such that each said plurality forms an alignment flange set as exemplified in FIGS. 1*f* and 2*a* where a first plurality of alignment flanges 70 (shown as three flanges 70 in the said figures) are spaced apart vertically from a plurality of further alignment flanges 70. The alignment flanges 70 of any one or more sets may commonly protrude outwardly from the wall substantially at the same height level, wherein each flange 70 of the same set is longitudinally spaced apart from an adjacent flange 70 preferably in a direction substantially parallel to the axis of connector engagement 8. Preferably all the flanges 70 of each set are arranged to be spaced apart along the same height level. Preferably, opposing flanges 70 are symmetrically located each side of a symmetry line running along the length of the connector 2 parallel to the direction of connector engagement 6. Preferably the said symmetry line is mid-way along the height of the wall.

Preferably each set of flanges comprises at least three flanges 70, a central flange and two end flanges disposed on opposite sides of the central flange. Any one or more of the flanges 70, preferably the opposing end flanges, may comprise an indented surface portion 86 configured to receive a tab 82 of an alignment spring 72 to secure the alignment spring 72 to the flanges 70. Preferably, the surface comprising the indented portion 86 comprises a surface extending directly outward from the wall, inclined towards or perpendicular to the axis of connector engagement 8. Preferably the indented portion 86 of the surface is bordered by a non-indented portion of the same surface in a direction outwardly away from the associated wall such that the said tab 82 is configured to at least partially reside within the indent 86, prevent the spring 72 from outwardly disengaging from the flanges 70. Preferably the said tab 82 is resiliently biased to lock into the indent 86.

Any one or more of the alignment flanges 70 may comprise a tapered surface inclined towards the said symmetry line such that when the housing 64, 65 is slotted onto a mounting board, an engaging edge 71 of the board 200 engaging with the alignment spring 72 is funnelled in between the opposing alignment flanges 70. Preferably the tapered surfaces are the outermost surfaces of the flange set in the direction of connector engagement 6 and preferably reside on at least one, preferably both of the end alignment flanges 70 of at least one, preferably both alignment flange sets.

Any one or more walls of the housing 64, 65 comprising the one or more alignment flanges 70 may further comprise a depression 88 or hole configured to accommodate a further tab 84 of an alignment spring 72. The hole may be formed through the wall and may further be shaped in the form of a slot running along the height of the wall.

The alignment spring 72 may comprise a first spring portion 74 comprising at least one tab. The first spring portion 74 is preferably configured to engage with one flange 70 or a set of alignment flanges 70 using one or more tabs, and run longitudinally along at least part of the length of the housing 64, 65. The first spring portion 74 may comprise a longitudinal sheet or strip comprising a plurality of surfaces adjoined by fold lines running substantially perpendicular to the length of the strip, wherein preferably the strip is configured such that the said surfaces substantially face in a direction substantially parallel to the height dimension of the wall. Each surface along the strip is configured to be resiliently biased at a different angle about a connecting fold line to an adjacent surface bordering the said fold line. Preferably, at least two adjacent surfaces along the strip are folded about a fold line such that when the alignment spring is engaged with the alignment flanges 70, the adjacent surfaces and fold line form an apex 80 protruding from the flanges towards the symmetry line, preferably in a direction substantially parallel to the height dimension of the adjacent housing wall. The first spring portion 74 may comprise two such apexes, each disposed adjacent to an end flange. Any apex 80 may comprise a plurality of fold lines located at the apex 80 with one or more additional surfaces spanning between said apex fold lines such that the apex 80 comprises a substantially flattened top.

The alignment spring may comprise a second spring portion 76 substantially similar to the first spring portion 74 wherein the second spring portion 76 is configured to engage with an opposing spaced apart flange or opposing spaced apart flange set. Preferably the second spring portion 76 comprises surfaces and fold lines substantially identical to but symmetrically opposite to the first spring portion 74 as exemplified in FIG. 2*a*. The first and second spring portions are preferably coupled together with one or more third spring portions 78. The third spring portion 78 preferably comprises one or more surfaces comprising a plane substantially parallel to the major plane of the adjacent housing wall. Preferably the third spring portion 78 comprises a sheet wherein one sheet surface substantially faces the said adjacent housing wall and an opposing sheet surface substantially faces directly away from the said wall. Preferably the third spring portion 78 adjoins and resides between the first and second spring portions 74, 76 such that when the alignment spring 72 is engaged with the alignment flanges 70 and/or adjacent housing wall, the alignment spring 72 is located substantially in between two spaced apart alignment flanges 70 or two sets of opposing alignment flanges 70 with the third spring portion 78 contacting or being proximally adjacent to the housing wall, and the first and second spring portions 74, 76 extend outwardly away from the third spring portion 78 and the said wall. In the case where the first and second portions 74, 76 are strips, the narrow dimension of the strip extends outwardly from the associated wall and third spring portion 78 whilst the long dimension of the strip runs substantially parallel along the wall, preferably substantially parallel to the axis of connector engagement 8.

In any of the examples of the alignment flanges 70 and/or alignment spring 72 there may be an alignment spring 72 comprising a first spring portion 74 with different surfaces and fold lines to the second spring portion 76. Furthermore, any connector 2 may comprise a single alignment flange 70 spaced apart from an opposing flange set.

Preferably the third spring portion 78 comprises one or more surfaces, fold lines, and apexes substantially as described for the first and second spring portions 74, 76, except that the apexes on the third spring portion 78 point substantially away from the adjacent side wall. Preferably the third spring portion 78 comprises a further tab 84 for engaging or inserting into a depression 88 or hole on or within the adjacent wall of the housing 64, 65. This further tab 84 may be a surface portion of the third spring portion 78. Preferably the said further tab 84 comprises a surface forming part of an apex 80. Preferably the third portion 78 is a strip comprising an substantially at the ends of the strip wherein one or preferably both endmost surfaces of the strips are further tabs that are inwardly turned to at least partially slot into depressions or holes in the housing wall.

The tabs of any of the first and/or second spring portions 74, 76 together with any further tabs of a third spring portion 78 are configured to cooperatively secure the alignment spring 72 to the adjacent housing wall and alignment flanges 70.

The alignment springs 72 are preferably configured so that each apex 80 is resiliently deformable from an initial raised position to a second position (preferably a substantially flattened position), wherein the apex 80 is biased to reside in the raised position.

Figures 13A, 13B:
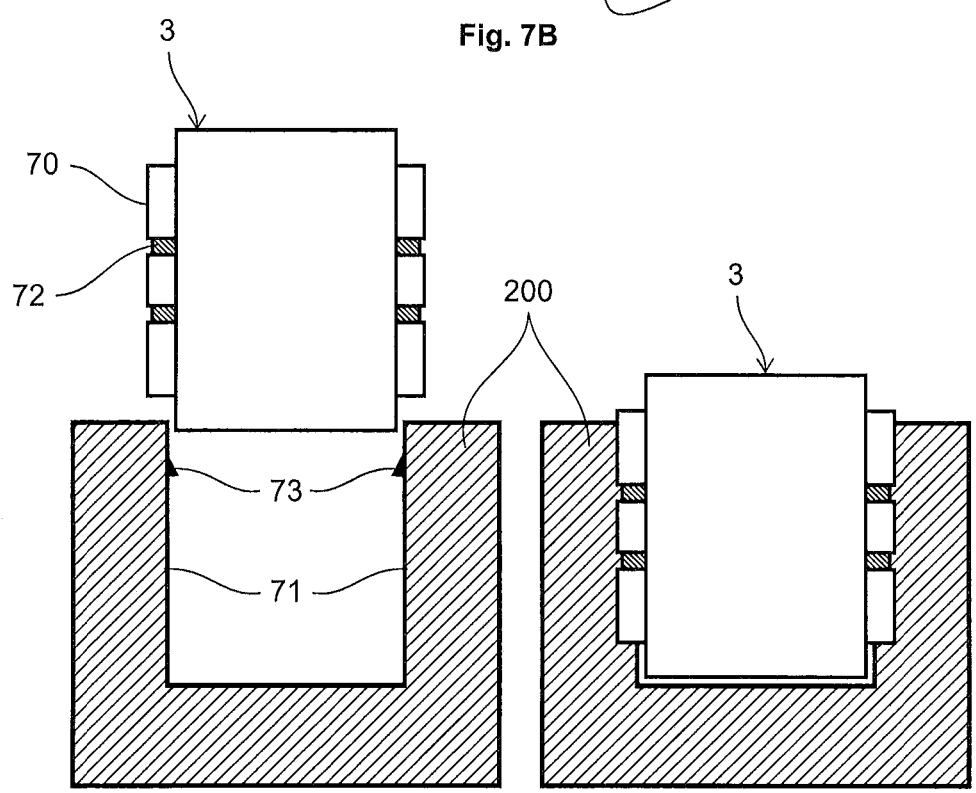
FIGS. 13a and 13b shows a plan view of a plug connector being into engagement within a slot in a PCB.

Preferably the connector 2 comprises a further housing wall comprising any of the alignment flanges 70 and/or alignment springs 72 as described above. Preferably, this further housing wall is an opposing wall to the above described first wall, for example the two walls form the side walls of the housing 64, 65 or the top and bottom walls of the housing 64, 65. Preferably the walls are two side walls of the housing 64, 65. Preferably, the alignment flanges 70 and/or springs 72 associated with each said wall are configured to engage a corresponding engaging edge 71 of the mounting platform 200 at an identical or substantially similar height about each wall. This allows the connector 2 to be engaged to the board 200 in a substantially level manner, preferably parallel to the major plane of the board 200. Preferably the mounting platform 200 comprises two opposite and substantially parallel engaging edges 71 located about a common plane wherein the connector 2 is configured to allow each platform edge 71 to slide between two sets of alignment flanges 70, and between first and second alignment spring portions as shown in FIGS. 13a and 13b.

Preferably the two engaging edges 71 form two edges of a slot extending substantially perpendicularly inward from a mounting board side engaging edge 71. The slot comprises a width sized at least to accommodate at least one dimension of the connector 2, for example the connector width. Preferably, any one or more of the engaging edges 61 comprises one or more engaging protrusions 73 laterally extending towards the opposing engaging edge 71 and configured to contact and depress one or more apexes on an alignment spring 72 as the connector 2 is slid at least partially into the mounting board slot. As shown in FIG. 13a, preferably both the engaging edges 71 comprise engaging protrusions 73. Preferably one or each of the engaging protrusions 73 comprises a front tapered edge that allows the alignment spring 72 to ride up and over the protrusion 73, and a back edge extending perpendicularly from the slot engaging edge 71.

Correspondingly, the said apexes of the alignment springs 72 are preferably configured to deform from the biased position to the second position as the engaging edge protrusions 73 pass over or through the alignment springs 72. Once the protrusion 73 has passed over the said apex 80, the apex 80 returns to the biased position thus securing the connector 2 to the housing 64, 65. The mounting platform 200 may further comprise one or more raised engaging protrusions (not shown in the figures) extending substantially perpendicularly outward (i.e. upwardly or downwardly) from the plane of the mounting board and adjacent and/or proximal to the engaging edge 71. When the connector 2 is slid into the slot, any one or more of the apexes of the first and/or second spring portions 74, 76 of an engaging alignment spring 72 contacts the raised engaging portion, depresses into the second position and then reforms into the biased pointed apex position as the raised portions passes over the apex 80.

Any of the spring portions 74, 76, 78 of any of the alignment springs 72 may comprise an apex 80 substantially at both the opposing long ends of the spring portion 74, 76, 78 such that an engaging protrusion 73 of the board is effectively locked between the two apexes when the connector 2 is mounted in between the two engaging edges 71 of the mounting board 200.

Preferably the two apexes on a first and/or second spring section 74, 76 are spaced apart substantially in the direction of connector engagement 6 such that the connector 2, when engaged with the mounting platform 200, may have a degree of freedom in moving about the platform at least along the direction parallel to the direction between the two said apexes. This advantage is brought about by having the mounting platform slot width sized to allow the connector 2 to move in these degrees of freedom. It is envisaged that such advantages may also be obtained when only one apex 80 is used on a spring portion to secure the connector 2 to the mounting platform.

Preferably two opposing housing walls comprise alignment flanges 70 and alignment springs 72, each spring comprising three portions, each having two opposing end apexes.

In this configuration the connector 2 may move about the mounting board in multiple degrees of freedom including forward (towards the side edge of the mounting board), backward, up and down (moving out of the plane of the mounting board), left and right (laterally in the plane of the mounting board), pitch, yaw and roll. It is envisaged that other examples of the said connector 2 with different combinations of flanges, alignment springs 72 and spring portions and apexes may also give rise, where technically viable, to any one or more of the above degrees of freedom. A connector 2 with one or more of the said degrees of freedom may therefore be simply slid and secured to the platform and, whilst secured, allowed to move to accommodate different axes of connector engagement and/or final connector engagement positions.

Alignment Component

The connector 2 may further comprise one or more alignment components 50, 51, 116 wherein each alignment component 50, 51, 116 comprises one or more guide surfaces or other features that function to mechanically align the connector 2 and/or optical component 4 into connecting engagement with a complementary connector 2 and/or complementary optical component 4 by physically contacting one or more complementary guide features upon the complementary connector 2. Any of the alignment components 50, 51, 116 may be separate components to other components of the connector 2 or may be integrally formed with any other component of the connector 2. Any of the alignment components 50, 51, 116 may comprise one or more features that align the connectors 2 in any one or more planes transverse to the direction of connector coupling, for example an alignment component 50, 51, 116 could provide features configured to vertically align and/or horizontally align the connector 2 and or optical component 4.

Any of the alignment components 50, 51, 116 may comprise one or more guide surfaces having a plane orientated substantially perpendicular to a plane of intended alignment, for example a plane substantially parallel to the major plane of the mounting platform 200. The surfaces may be elongated along the length of the connector 2 (i.e. substantially from the front to the back of the connector 2). The alignment component 50, 51, 116 may comprise at least one or more sets of one or more such surfaces arranged sequentially along a plane of intended alignment and/or substantially parallel to the direction of connector engagement 6. A set of guiding surfaces may comprise two or more guide surfaces wherein at least one guide surface substantially faces in an opposing direction to another guide surface in the same set, such that the said guide surface set is configured to align and guide the connector 2 and/or optical component 4 in both directions in the plane of intended alignment. For example, for vertical alignment, one guide surface of the set faces substantially upwards, the other surface faces substantially downwards.

The guide surfaces may form a tapered guiding arrangement substantially narrowing or widening along the direction of connector engagement 6 as the guiding surfaces in the same set tend towards the front of the connector 2. Preferably, the guide surfaces in a forward narrowing tapering set comprise a bottom surface facing downwards and an upper surface facing upwards. Correspondingly a backwards narrowing tapering set preferably comprises a bottom guide surface facing upwards and an upper guide surface facing downwards. The alignment component 50, 51, 116 may comprise a plurality of guide surfaces configured to guide connector engagement in a plurality of alignment planes. For example, the alignment component 50, 51, 116 may comprise one or more guide surfaces or guide surface sets suitable for guiding in one alignment plane and a further one or more guide surfaces or guide surface sets suitable for guiding in another alignment plane. The different intended alignment planes of the alignment component 50 may be orthogonal to each other, for example the same alignment component 50, 51, 116 may comprise one or more guide surfaces configured to align and guide in the vertical and horizontal planes. Furthermore the alignment component 50, 51, 116 may guide in both directions in any one of its alignment planes, for example an alignment component 50, 51, 116 may comprise a set of guide surfaces configured to align both directions in the vertical plane and a single guide surface configured to align in a single direction in the horizontal plane.

The alignment component 50, 51, 116 may comprise any one of its guide surfaces on one or more physical features or components. For example, the alignment component 50, 51, 116 may comprise a dedicated single taper block or raised feature integrally formed upon another component, comprising one or more vertical walls acting as horizontal guide surfaces and two horizontal walls tapering to provide vertical guide surfaces.

The connector 2 may comprise a plurality of alignment components 50, 51, 116 that form an alignment component system that guides in one or more directions in one or more alignment planes by combining the respective guide surface alignment directions on each component. The alignment components 50, 51, 116 may be disposed about the connector 2 in a fixed relationship.

Front Engaging Component

The connector 2 may further comprise a front engaging component 48 operative to provide any of: a mounting platform for one or more covers 12, 28 and/or shields 20, 38 and/or an alignment component 50, 51, 116 and/or a mounting platform for the optical component 4; and/or a recess or other fixture or fitting for anchoring one or more covers and/or shields 20, 38; and/or one or more features for contacting and pushing apart one or more covers of a complementary connector 2. An example of a front engaging component 48 is shown in FIGS. 2b, 3a and 3b.

The front engaging component 48 may be moveable relative to the connector 2 and/or a housing 64, 65. Preferably the front engaging component 48 is moveable parallel to the direction of connector engagement 6 whereby the front engaging component 48 is configured to slide in at least one degree of freedom along the length of the housing 64, 65 or connector 2 (i.e. sliding towards the front end and retracting towards the back end). Preferably the front engaging component 48 is restricted to move only in this degree of freedom.

The front engaging component 48 preferably comprises at least a top section, two opposing side sections and a bottom section such that the said sections create a through channel from the front to the back of the front engaging component 48. The said side sections each preferably comprise an alignment component 50, 51, as described herein. Preferably, each alignment component 51 comprises two tapered surfaces for vertical alignment and one surface for horizontal alignment as shown, for example, in FIGS. 3a and 5b.

The front engaging component 48 preferably comprises mounting features/anchoring features for two vertically opening opposing covers laterally bordered by two alignment components 51.

The connector 2 may comprises a housing 64 with an overhanging portion that overhangs the front end portion at least when the front engaging component 48 is fully retracted into the housing 64.

Alternatively the cover 12, 28 may be mounted upon the housing 64, 65.

Optical Mount

The connector 2 may comprise one or more optical mounts 90 comprising one or more mounting sections configured to mount or hold the optical component 4. The mounting section may comprise any of: a platform, one or more resiliently biased grips 92 operative to snap fit to the optical component 4, or any other suitable grip or mechanism to secure the optical component 4 to the optical mount 90. Preferably the mount comprises two opposing grips 92 each having terminal inwardly extending hooks 94.

FIGS. 3c and 3d show an optical mount 90 of a connector 2 as described herein, for example a plug connector 2 wherein an optical MT ferrule is slotted into forwardly extending grips 92. In principle the optical component 4 may be any suitable optical component 4 and the optical mount 90 may rigidly secure the optical component 4 be any suitable means such as a friction fit and/or use of an adhesive material.

For a connector 2 as described herein that comprises a front engaging component 48 and an optical mount 90 behind the front engaging component 48, the front engaging component 48 may be termed a first connector component and the optical mount 90 may be termed a second connector component. Preferably the optical mount 90 is configured to move about the connector 2 in one or more degrees of freedom substantially as described for the front engaging component 48.

The optical mount 90 may be resiliently biased against the front engaging component 48 via one or more biasing components 58, such as but not limited to a spring. The biasing component is configured to push the optical mount 90 apart from the front engaging component 48 in the direction of connector engagement 6. Any biasing component 58 may be formed integrally with any of the front engaging component 48 or optical mount 90, or may be a separate component.

Preferably the front engaging component 48 is located in front of the optical mount 90 along the direction of connector engagement 6. Preferably the mounting section of the optical mount 90 extends laterally forward from the optical mount 90 towards the direction of connector coupling 6 and/or optical communication 10 and is configured, in use, to be able to protrude (together with the optical component 4) at least partially into and/or through and/or past the front engaging component 48. This may be, for example, into a channel formed by side sections and top and bottom sections of a front engaging component 48.

The optical mount 90 may further comprise one or more flanges 96 extending proud of the mounting section, perpendicular to the direction of connector engagement 6. The flanges comprise one or more portions for contacting one or more biasing components 58, wherein the portions may comprise a feature for securing the biasing component such as: a surface recess 56 which the biasing component protrudes into. Preferably the flanges 96 extend laterally proud of the mounting section such that when the optical mount 90 is located behind the front engaging component 48, one or more biasing components 58 may reside in between, and be engagable with, the said flanges and each of the side sections of the front engaging component 48.

Back End Component

The connector 2 may comprise one or more back end components 60. The back end component 60 may act as a biasing reference portion, that when assembled onto or in the connector 2 forms a fixed rigid relationship with the connector 2. The back end component 60 is configured to connect to the back end of a connector housing 64, 65. The back end component 60 may comprise one or more features operative to securely snap fit the back end component 60 to the housing 64, 65 by comprising one or more forwardly extending lugs 62 extending from a back section 66. The back section 66 may comprise a panel. The lugs 62 may terminate at a distal end from the back section 66 with an outwardly extending hook operative to engage a complementary recess or protrusion upon the housing 64, 65. The lugs 62 and/or back end portion may be formed of a substantially rigid material that has a degree of resilient deformity to allow the lugs 62 to form snap fits. One or more lugs 62 may also be operative to provide a longitudinal sliding platform for an optical mount 90 to slide upon.

The back section of the back end component 60 preferably comprises a portion operative to engage with one or more biasing components 58 that resiliently biases an optical mount 90 away from the back section in the direction of connector engagement 6. This portion may be a recess or depression 56 that is configured to house at least a portion of said biasing component 58, or any other suitable means to either locate or couple said biasing component 58 against the back end component 60. The back end component 60 may comprise one or more forward facing house engaging surfaces configured to contact a back facing portion of the housing 64, 65, and together with a hook ended lug, act in combination to releasably secure the back end component 60 to the housing 64, 65. Preferably the back section comprises a rectangular profile facing the direction of connector engagement 6. Preferably four snap fitting lugs 62 are provided. The back sections preferably comprise a panel. The back section may comprise one or more cut-outs or through holes via which objects may pass into or out of the connector 2 such as fibres leading to the optical component 4.

Embodiments of the present invention have been described with particular reference to the examples illustrated. However, it will be appreciated that variations and modifications may be made to the examples described within the scope of the present invention.

The invention claimed is:

1. An optical connector, suitable for coupling with a complementary connector along a direction of connector engagement and supporting a first optical component; the connector comprising
  a first cover comprising an outer surface, the first cover configured to have a first position and a second position, the first and second positions being end positions,
  the first position of the first cover residing at least partially in-front of the first optical component along a direction parallel to the direction of connector engagement; and providing at least a component of the outer surface normal, that is parallel to the direction of the connector engagement;
  the second position of the first cover residing at least partially in-front of the first optical component along the direction parallel to the direction of connector engagement; and
  the first cover being movable to the second position, and
  the outer surface of the first cover continually faces away from the first optical component upon movement between the first and second positions.

2. An optical connector as claimed in claim 1 wherein the first cover further comprises an inner surface and the first cover, in the first position, provides that:
  the outer surface at least partially faces towards the direction of connector engagement; and
  the inner surface at least partially faces the first optical component.

3. An optical connector as claimed in claim 1 wherein the first cover at least partially obscures the first optical component along the direction of connector engagement when in the first position.

4. An optical connector as claimed in claim 1 wherein the second position of the first cover creates an opening sized to accommodate at least the first optical component.

5. An optical connector as claimed in claim 1 wherein the second position of the first cover creates an opening sized to accommodate at least part of the complementary optical connector.

6. An optical connector as claimed in claim 1 further comprising a second cover, the second cover configured to be moveable between a first and second position, wherein each of the first and second covers are configured to be urged substantially apart from the other cover as each cover is mechanically urged from its respective first position to second position.

7. An optical connector as claimed in claim 6 wherein the first and second covers are together configured in their respective second positions to create an opening sized to accommodate at least the first optical component.

8. An optical connector as claimed in claim 6 wherein the first and second covers are together configured in their respective second positions to create an opening sized to accommodate at least part of the complementary optical connector.

9. An optical connector as claimed in claim 6 wherein each cover substantially converges towards the other cover, and each of the first and second covers further comprise forwardly terminating lips that are outwardly turned away from the other cover.

10. An optical connector as claimed in claim 1 wherein the optical connector is configured to move the first optical component to contact and urge the first cover from a respective first position to a second position as the first and second optical connectors are urged into mechanical engagement.

11. An optical connector suitable for coupling with a complementary connector along a direction of connector engagement; and supporting a first optical component; the connector comprising:
  an optical communication path towards the complementary connector;
  a first cover comprising an outer surface, wherein the first cover is moveable between a first position and a second position, the first and second positions being end positions,
    the first position of the first cover residing at least partially in-front of the first optical component along a direction parallel to the direction of connector engagement; and providing at least a component of the outer surface normal, that is parallel to the direction of connector engagement;
    the second position of the first cover residing at least partially in-front of the first optical component along the direction parallel to the direction of connector engagement; and
  a first shield moveable between a first position and a second position, the first position of the first shield is configured to be disposed in the optical communication path.

12. An optical connector as claimed in claim 11 wherein in the first position, the first shield is configured to be disposed between the first optical component and the first cover when the first cover is in the first position.

13. An optical connector as claimed in claim 11 wherein the first cover and first shield are configured to be mechanically urged from their respective first positions towards their respective second positions as the optical connector and complementary connector are urged into coupling engagement.

14. An optical connector as claimed in claim 13 wherein the first shield is configured to move from its first position towards its second position after the first cover moves from its first position towards its second position, as the optical connector and complementary connector are urged into coupling engagement.

15. An optical connector as claimed in claim 11 wherein the first shield comprises:
- a first shield portion comprising an outer shield surface, wherein the first shield portion, when the first shield is configured in the first position resides at least partially in front of the first optical component along a direction parallel to the direction of connector engagement; and
- provides at least a component of the outer shield surface normal, that is parallel to the direction of connector engagement; and
- a second shield portion, wherein the second shield portion, when the first shield is configured in the first position is disposed in the optical communication path.

\* \* \* \* \*